(12) United States Patent
Mihara

(10) Patent No.: US 7,289,273 B2
(45) Date of Patent: Oct. 30, 2007

(54) ZOOM LENS AND ELECTRONIC IMAGING APPARATUS HAVING THE SAME

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 162 days.

(21) Appl. No.: 11/076,236

(22) Filed: Mar. 10, 2005

(65) Prior Publication Data
US 2005/0207024 A1 Sep. 22, 2005

(30) Foreign Application Priority Data
Mar. 17, 2004 (JP) ............................. 2004-076777

(51) Int. Cl.
G02B 15/14 (2006.01)
G02B 13/18 (2006.01)

(52) U.S. Cl. ...................... 359/676; 359/677; 359/683; 359/686; 359/689; 359/691; 359/693; 359/713; 359/714; 359/715; 359/716; 359/717; 359/718; 359/740

(58) Field of Classification Search ........ 359/676–693, 359/713–718, 740
See application file for complete search history.

(56) References Cited

U.S. PATENT DOCUMENTS 6,124,984 A * 9/2000 Shibayama et al. ......... 359/689
2003/0058548 A1 3/2003 Itoh
2004/0169764 A1 9/2004 Ishii et al.

FOREIGN PATENT DOCUMENTS

JP 2003-177315 6/2003

* cited by examiner

Primary Examiner—Evelyn A. Lester
(74) Attorney, Agent, or Firm—Kenyon & Kenyon, LLP

(57) ABSTRACT

A zoom lens includes, in order from the object side, the first lens unit consisting of one negative lens component in which a plurality of lens components are cemented to one another and the second lens unit including one negative lens component and having positive refracting power as a whole. In this case, the zoom lens satisfies the following condition:

$$0.15 < t_1/fw < 0.6$$

where $t_1$ is the thickness, measured along the optical axis, of the first lens unit and fw is the focal length of the entire system at the wide-angle position of the zoom lens.

69 Claims, 14 Drawing Sheets

FIG.2A
SPHERICAL ABERRATION
FNO 2.820
FIG.2B
ASTIGMATISM
IH=2.00
FIG.2C
DISTORTION
IH=2.00
FIG.2D
CHROMATIC ABERRATION OF MAGNIFICATION
IH=2.00
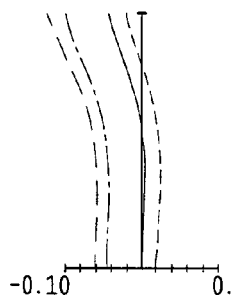
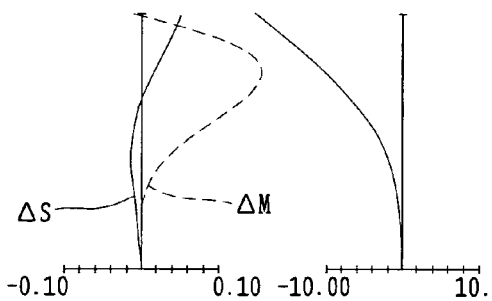
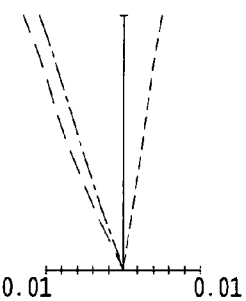
FIG.2E
SPHERICAL ABERRATION
FNO 3.504
FIG.2F
ASTIGMATISM
IH=2.25
FIG.2G
DISTORTION
IH=2.25
FIG.2H
CHROMATIC ABERRATION OF MAGNIFICATION
IH=2.25
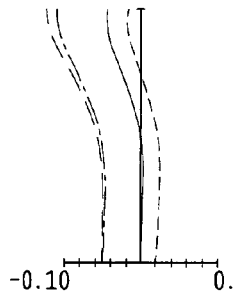
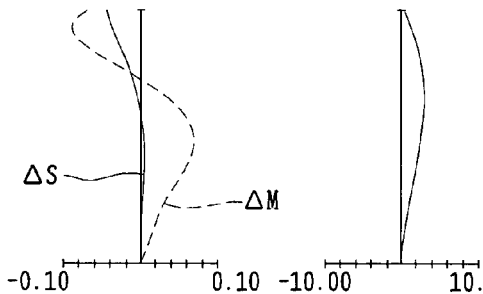
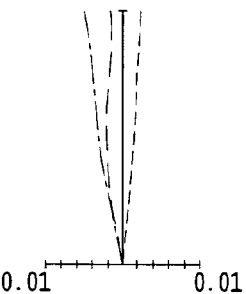
FIG.2I
SPHERICAL ABERRATION
FNO 4.829
FIG.2J
ASTIGMATISM
IH=2.25
FIG.2K
DISTORTION
IH=2.25
FIG.2L
CHROMATIC ABERRATION OF MAGNIFICATION
IH=2.25
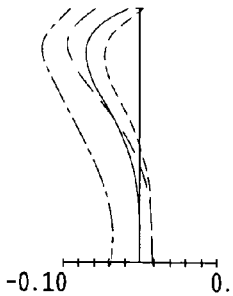
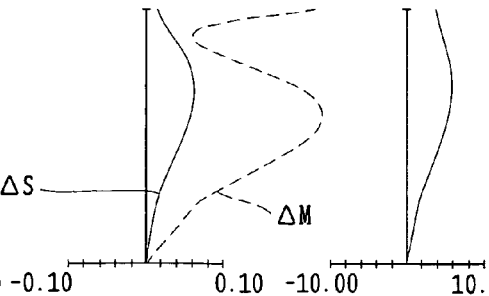
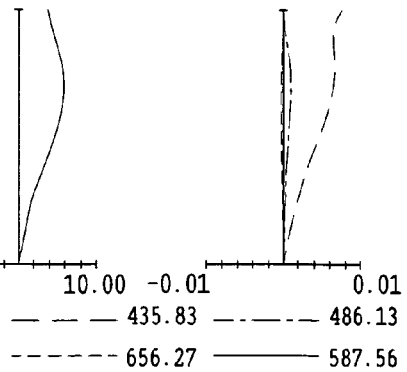
— — — 435.83   — · — · — 486.13
— — — — 656.27   ———— 587.56

FIG.3A
COMA(TRANSVERSE ABERRATION)
IH=0.94
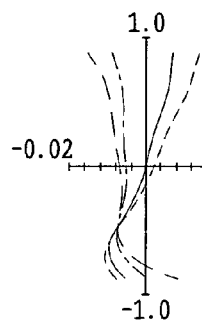

FIG.3B
COMA(TRANSVERSE ABERRATION)
IH=1.35
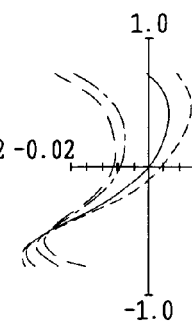

FIG.3C
COMA(LONGITUDINAL ABERRATION)
IH=0.94
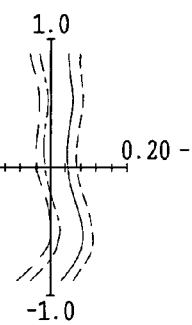

FIG.3D
COMA(LONGITUDINAL ABERRATION)
IH=1.35
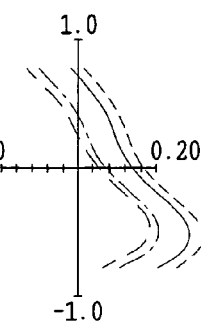

FIG.3E
COMA(TRANSVERSE ABERRATION)
IH=0.90
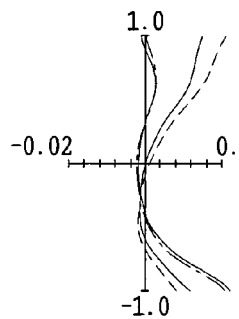

FIG.3F
COMA(TRANSVERSE ABERRATION)
IH=1.35
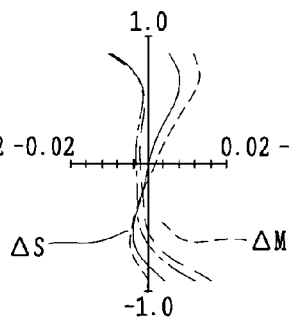

ΔS  ΔM

FIG.3G
COMA(LONGITUDINAL ABERRATION)
IH=0.90
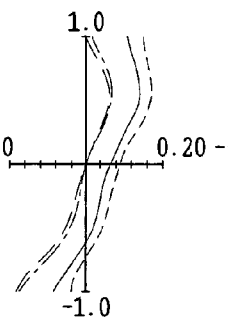

FIG.3H
COMA(LONGITUDINAL ABERRATION)
IH=1.35
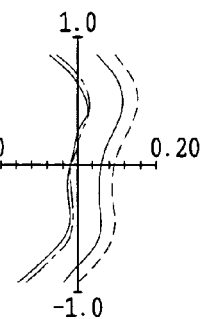

FIG.3I
COMA(TRANSVERSE ABERRATION)
IH=0.90
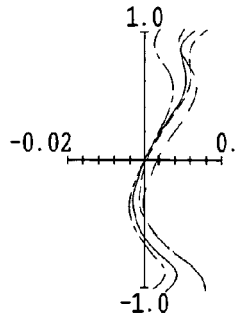

FIG.3J
COMA(TRANSVERSE ABERRATION)
IH=1.35
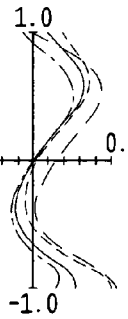

FIG.3K
COMA(LONGITUDINAL ABERRATION)
IH=0.90
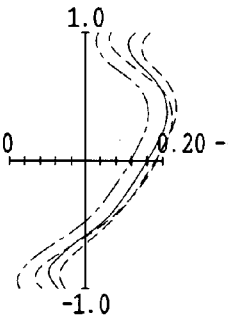

FIG.3L
COMA(LONGITUDINAL ABERRATION)
IH=1.35
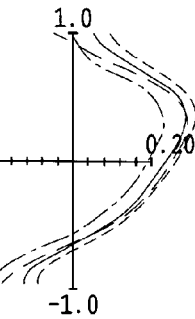

— — — 435.83    — · — · — 486.13
— — — — — 656.27    ——————— 587.56

FIG.5A
SPHERICAL ABERRATION
FNO 2.835
FIG.5B
ASTIGMATISM
IH=2.00
FIG.5C
DISTORTION
IH=2.00
FIG.5D
CHROMATIC ABERRATION OF MAGNIFICATION
IH=2.00
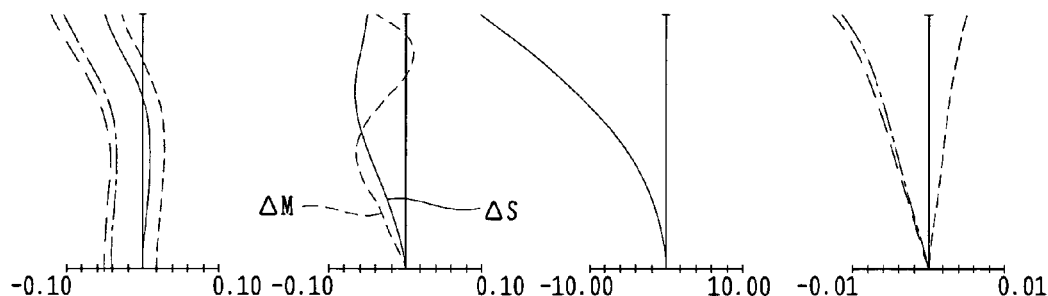
FIG.5E
SPHERICAL ABERRATION
FNO 3.504
FIG.5F
ASTIGMATISM
IH=2.25
FIG.5G
DISTORTION
IH=2.25
FIG.5H
CHROMATIC ABERRATION OF MAGNIFICATION
IH=2.25
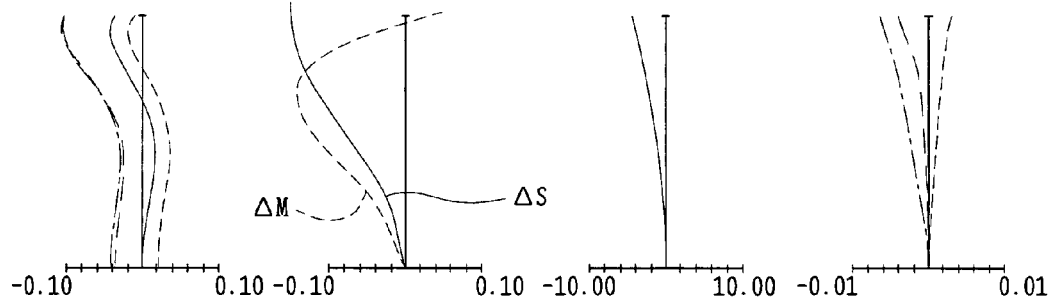
FIG.5I
SPHERICAL ABERRATION
FNO 4.817
FIG.5J
ASTIGMATISM
IH=2.25
FIG.5K
DISTORTION
IH=2.25
FIG.5L
CHROMATIC ABERRATION OF MAGNIFICATION
IH=2.25
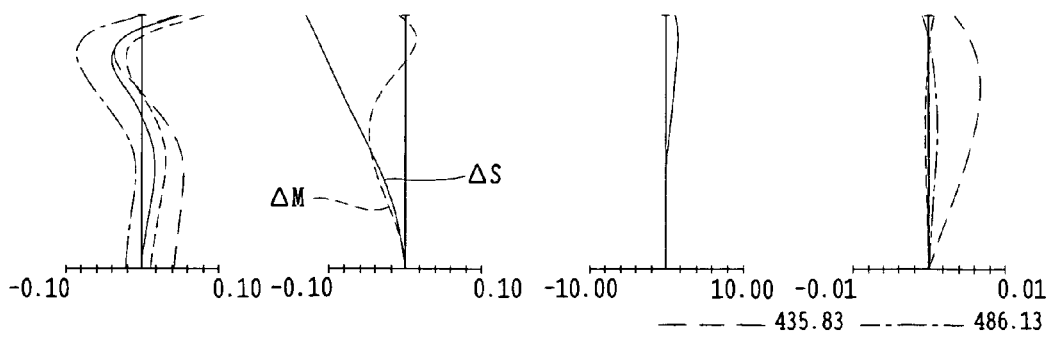
— — — 435.83   — · · — 486.13
– – – – – 656.27   ———— 587.56

FIG.6A
COMA(TRANSVERSE ABERRATION)
IH=0.94
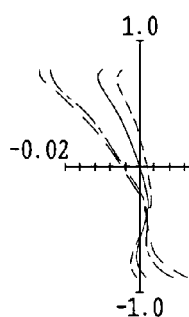

FIG.6B
COMA(TRANSVERSE ABERRATION)
IH=1.35
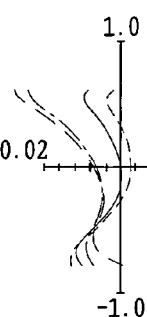

FIG.6C
COMA(LONGITUDINAL ABERRATION)
IH=0.94
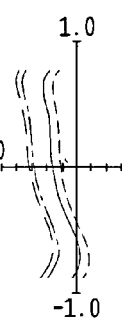

FIG.6D
COMA(LONGITUDINAL ABERRATION)
IH=1.35
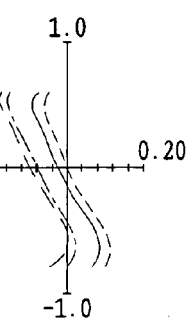

FIG.6E
COMA(TRANSVERSE ABERRATION)
IH=0.90
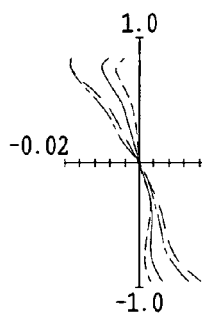

FIG.6F
COMA(TRANSVERSE ABERRATION)
IH=1.35
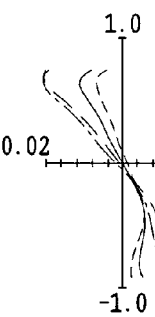

FIG.6G
COMA(LONGITUDINAL ABERRATION)
IH=0.90
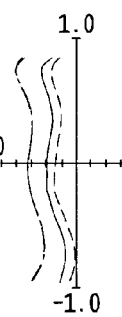

FIG.6H
COMA(LONGITUDINAL ABERRATION)
IH=1.35
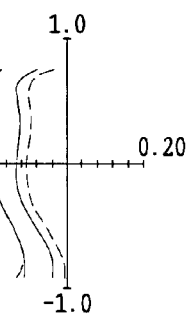

FIG.6I
COMA(TRANSVERSE ABERRATION)
IH=0.90
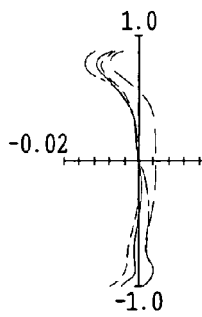

FIG.6J
COMA(TRANSVERSE ABERRATION)
IH=1.35
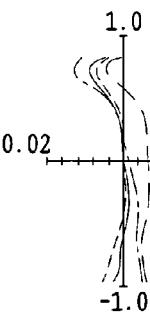

FIG.6K
COMA(LONGITUDINAL ABERRATION)
IH=0.90

FIG.6L
COMA(LONGITUDINAL ABERRATION)
IH=1.35
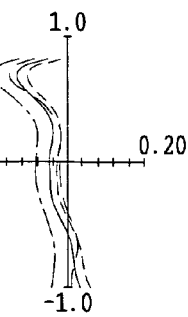

――― 435.83   ―・―・― 486.13
------ 656.27   ――――― 587.56

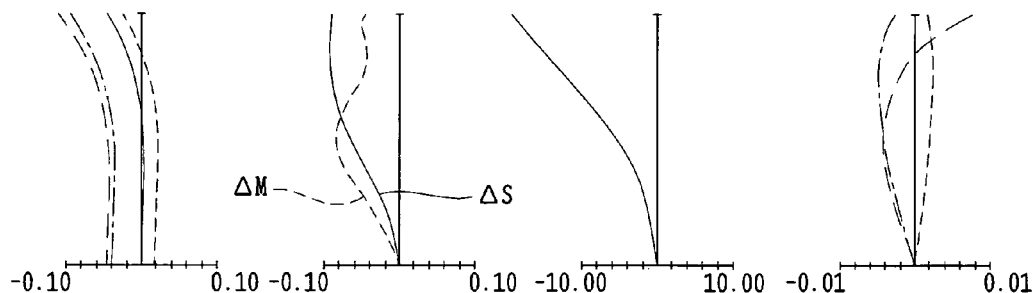

FIG.8A SPHERICAL ABERRATION FNO 2.846
FIG.8B ASTIGMATISM IH=2.00
FIG.8C DISTORTION IH=2.00
FIG.8D CHROMATIC ABERRATION OF MAGNIFICATION IH=2.00

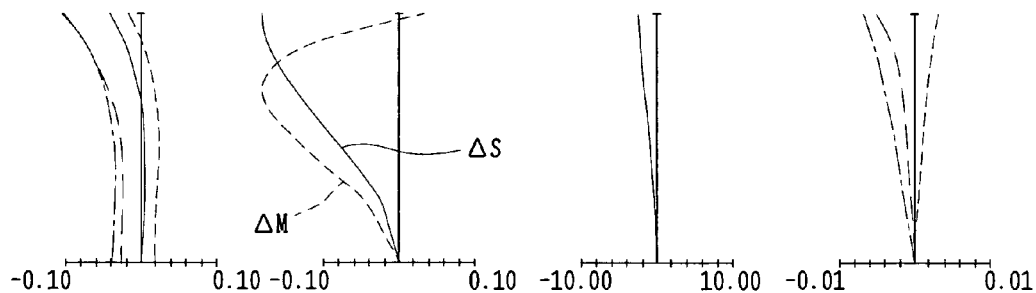

FIG.8E SPHERICAL ABERRATION FNO 3.577
FIG.8F ASTIGMATISM IH=2.25
FIG.8G DISTORTION IH=2.25
FIG.8H CHROMATIC ABERRATION OF MAGNIFICATION IH=2.25

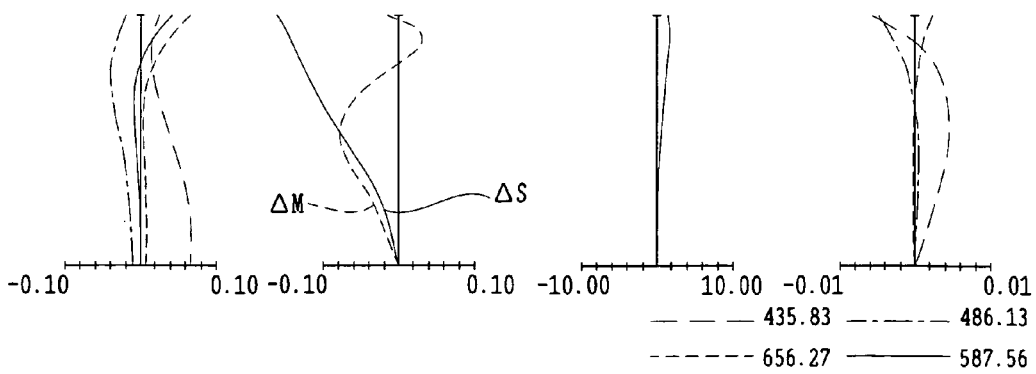

FIG.8I SPHERICAL ABERRATION FNO 4.935
FIG.8J ASTIGMATISM IH=2.25
FIG.8K DISTORTION IH=2.25
FIG.8L CHROMATIC ABERRATION OF MAGNIFICATION IH=2.25

— — — 435.83   — · · — 486.13
- - - - - 656.27   ———— 587.56

FIG.9A
COMA(TRANSVERSE ABERRATION)
IH=0.94
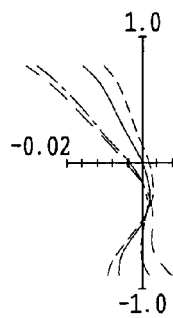

FIG.9B
COMA(TRANSVERSE ABERRATION)
IH=1.35
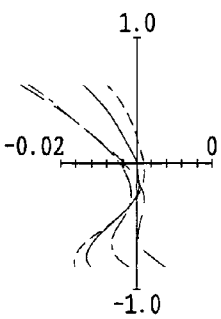

FIG.9C
COMA(LONGITUDINAL ABERRATION)
IH=0.94
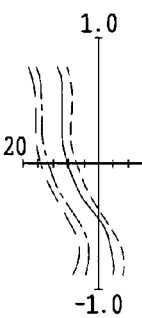

FIG.9D
COMA(LONGITUDINAL ABERRATION)
IH=1.35
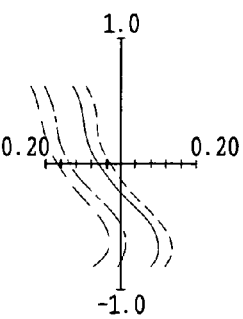

FIG.9E
COMA(TRANSVERSE ABERRATION)
IH=0.90
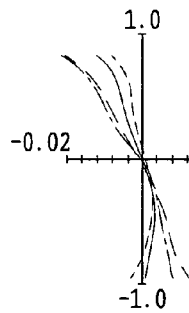

FIG.9F
COMA(TRANSVERSE ABERRATION)
IH=1.35
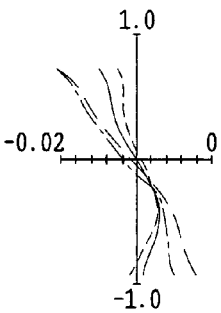

FIG.9G
COMA(LONGITUDINAL ABERRATION)
IH=0.90
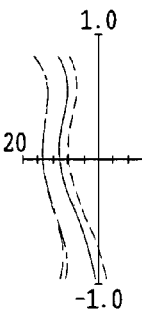

FIG.9H
COMA(LONGITUDINAL ABERRATION)
IH=1.35
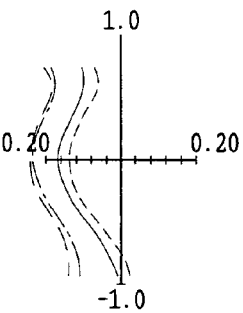

FIG.9I
COMA(TRANSVERSE ABERRATION)
IH=0.90
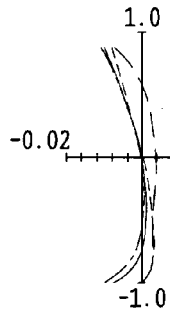

FIG.9J
COMA(TRANSVERSE ABERRATION)
IH=1.35
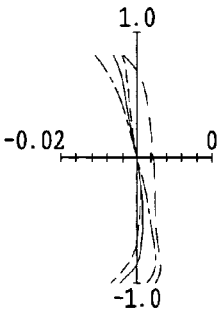

FIG.9K
COMA(LONGITUDINAL ABERRATION)
IH=0.90
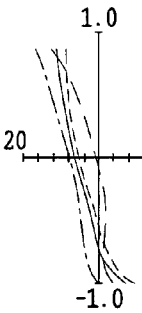

FIG.9L
COMA(LONGITUDINAL ABERRATION)
IH=1.35
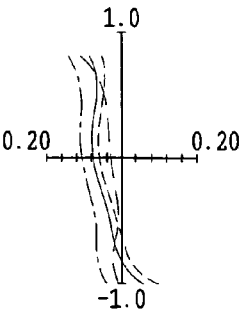

— — — 435.83    —·—·— 486.13
------ 656.27    ———— 587.56

FIG.16A
FIG.16B
FIG.16C
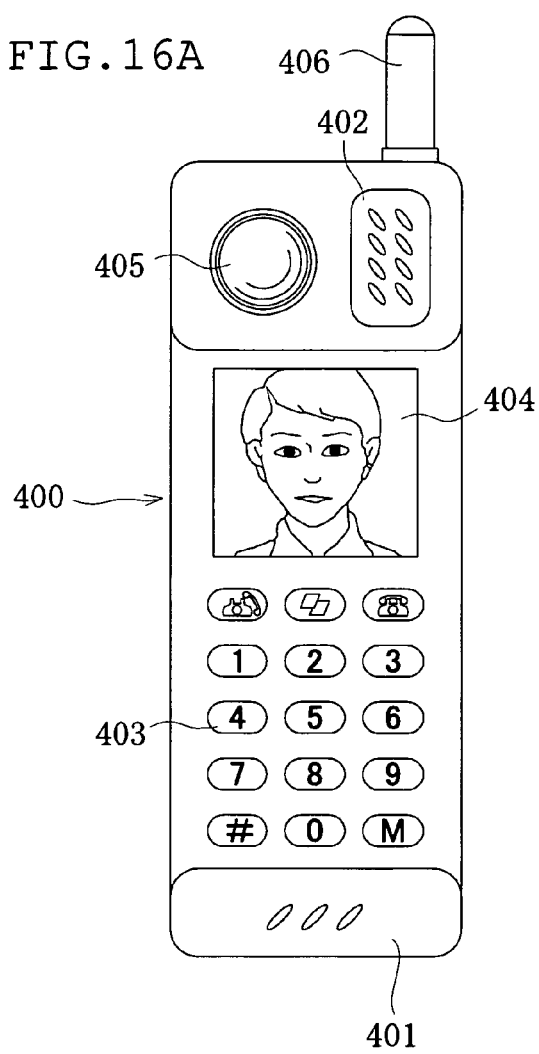
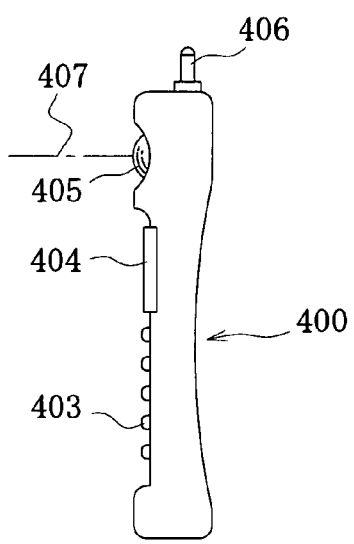
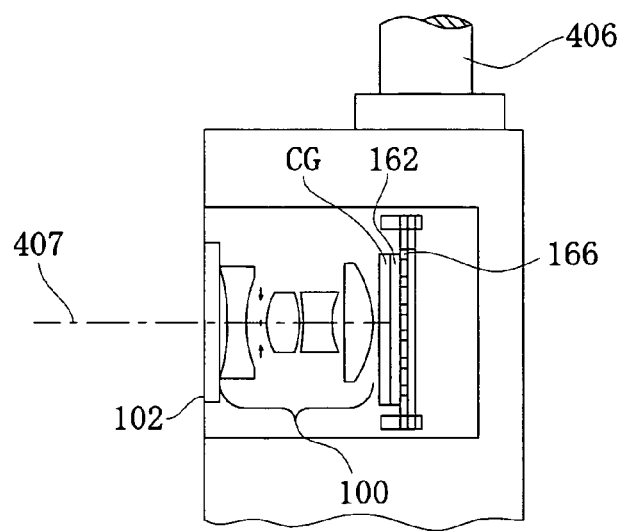

ZOOM LENS AND ELECTRONIC IMAGING APPARATUS HAVING THE SAME

This application claims benefits of Japanese Application No. 2004-76777 filed in Japan on Mar. 17, 2004, the contents of which are incorporated by this reference.

BACKGROUND OF THE INVENTION

1. Field of the Invention

The invention relates to a zoom lens used in an extremely small imaging module, and in particular, to an electronic imaging apparatus in which an imaging module is considered to achieve compactness of a zoom lens.

2. Description of Related Art

In recent years, digital cameras have been popularized as the next generation cameras of an alternative to silver halide film cameras. More recently, the digital cameras have become increasingly compact and slim. Even in mobile phones being popularized at the same time, camera functions are retained (which are hereinafter referred to as imaging modules). To mount the imaging modules in the mobile phones, however, they must be made smaller and slimmer than the digital cameras. However, zoom lenses so downsized that they can be mounted in the mobile phones are little known nowadays.

In order to satisfy very severe size conditions of compact and slim design, it is necessary to consider Means A-D described below.

A. A collapsible mount type of lens barrel is used to incorporate an optical system along the direction of the thickness (depth) of a camera body. This collapsible mount type of lens barrel is such that the optical system is shifted out of the camera body on photographing and is incorporated in the camera body on carrying.

B. A bending optical system is adopted to incorporate the optical system along the direction of the width or height of the camera body. This bending optical system is constructed so that the optical path (optical axis) of the optical system is bent by a reflecting optical element, such as a mirror or prism.

C. The optical system is incorporated along the direction of the width of the camera body (for example, in the hinge portion of the mobile phone), without changing the length of the optical system.

D. The optical system is mounted in connection with the camera body, with the length of the optical system kept to a predetermined value, so that a connecting portion can be rotated. By doing so, it is only necessary that even when the length of the optical system in a longitudinal direction is greater than the thickness of the camera body on photographing, the longitudinal direction of the optical system is made to coincide with the direction of the width of the camera body on incorporating. Thus, in an incorporated state, the thickness of the camera body is not increased.

In the compact and slim design, it is particularly desired that the optical system can be incorporated along the direction of the thickness of the camera body as in Means A and B. Conventional examples using Means A and B are set forth, for example, in Japanese Patent Kokai Nos. 2002-365543 and 2003-43354, respectively.

SUMMARY OF THE INVENTION

The zoom lens according to the present invention comprise, in order from the object side, a first lens unit consisting of one negative lens component in which a plurality of lens elements are cemented to one another and a second lens unit including one negative lens component and having positive refracting power as a whole. In this case, the zoom lens satisfies the following condition:

$$0.15 < t_1/fw < 0.6$$

where $t_1$ is the thickness, measured along the optical axis, of the first lens unit and fw is the focal length of the entire system at the wide-angle position of the zoom lens. One lens component refers to a single or cemented lens, or a compound lens such that resin is adhered to and cured on a lens surface.

The zoom lens of the present invention comprises a plurality of lens units, with a stop between them, and a lens unit located on either the object or image side of the stop has a cementing surface, which is aspherical.

The zoom lens of the present invention comprises a plurality of lens units, with a stop between them, and each of one of lens units located on the object side of the stop and one of lens units on the image side of the stop has a cementing surface, which is aspherical.

The zoom lens of the present invention comprises at least one lens unit with positive refracting power and at least one lens unit with negative refracting power. The at least one lens unit with positive and/or negative refracting power has a cementing surface, which is aspherical.

The electronic imaging apparatus of the present invention comprises the zoom lens of the present invention described above and an electronic image sensor located on the image side of the most image-side lens unit of the zoom lens, or comprises, in order from the object side, a zoom lens that has a first lens unit consisting of one negative lens component and a second lens unit including one negative lens component, having positive refracting power as whole, and an electronic image sensor located on the image side of the most image-side lens unit in the zoom lens. It is possible that image data obtained when an image formed through the zoom lens is picked up by the electronic image sensor are processed and output as image data whose profile is changed. The zoom lens, in focusing of an infinite object point, satisfies of the following condition:

$$0.7 < y_{07}/(fw \cdot \tan \omega_{07w}) < 0.96$$

where when a distance from the center to the farthest point on the effective imaging surface of the electronic image sensor is denoted by $y_{10}$, $y_{07} = 0.7 y_{10}$, and $\omega_{07w}$ is an angle made by the optical axis with the direction of an object point corresponding to an image point connecting the center of the imaging surface and the position of the distance $y_{07}$ at the wide-angle position.

According to the present invention, even when an image sensor of high pixel density is used, the compact and slim design of the zoom lens can be accomplished, and the improvement of the specification, such as a wide-angle design, and a cost reduction can also be attained.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, 2C, and 2D are diagrams showing aberration characteristics, in focusing of the infinite object point, at the wide-angle position of the zoom lens in the first embodiment;

FIGS. 2E, 2F, 2G, and 2H are diagrams showing aberration characteristics, in focusing of the infinite object point, at the middle position of the zoom lens in the first embodiment;

FIGS. 2I, 2J, 2K, and 2L are diagrams showing aberration characteristics, in focusing of the infinite object point, at the telephoto position of the zoom lens in the first embodiment;

FIGS. 3A, 3B, 3C, and 3D are diagram showing coma characteristics, in focusing of the infinite object point, at the wide-angle position of the zoom lens in the first embodiment;

FIGS. 3E, 3F, 3G, and 3H are diagram showing coma characteristics, in focusing of the infinite object point, at the middle position of the zoom lens in the first embodiment;

FIGS. 3I, 3J, 3K, and 3L are diagram showing coma characteristics, in focusing of the infinite object point, at the telephoto position of the zoom lens in the first embodiment;

FIGS. 5A, 5B, 5C, and 5D are diagrams showing aberration characteristics, in focusing of the infinite object point, at the wide-angle position of the zoom lens in the second embodiment;

FIGS. 5E, 5F, 5G, and 5H are diagrams showing aberration characteristics, in focusing of the infinite object point, at the middle position of the zoom lens in the second embodiment;

FIGS. 5I, 5J, 5K, and 5L are diagrams showing aberration characteristics, in focusing of the infinite object point, at the telephoto position of the zoom lens in the second embodiment;

FIGS. 6A, 6B, 6C, and 6D are diagram showing coma characteristics, in focusing of the infinite object point, at the wide-angle position of the zoom lens in the second embodiment;

FIGS. 6E, 6F, 6G, and 6H are diagram showing coma characteristics, in focusing of the infinite object point, at the middle position of the zoom lens in the second embodiment;

FIGS. 6I, 6J, 6K, and 6L are diagram showing coma characteristics, in focusing of the infinite object point, at the telephoto position of the zoom lens in the second embodiment;

FIGS. 8A, 8B, 8C, and 8D are diagrams showing aberration characteristics, in focusing of the infinite object point, at the wide-angle position of the zoom lens in the third embodiment;

FIGS. 8E, 8F, 8G, and 8H are diagrams showing aberration characteristics, in focusing of the infinite object point, at the middle position of the zoom lens in the third embodiment;

FIGS. 8I, 8J, 8K, and 8L are diagrams showing aberration characteristics, in focusing of the infinite object point, at the telephoto position of the zoom lens in the third embodiment;

FIGS. 9A, 9B, 9C, and 9D are diagram showing coma characteristics, in focusing of the infinite object point, at the wide-angle position of the zoom lens in the third embodiment;

FIGS. 9E, 9F, 9G, and 9H are diagram showing coma characteristics, in focusing of the infinite object point, at the middle position of the zoom lens in the third embodiment;

FIGS. 9I, 9J, 9K, and 9L are diagram showing coma characteristics, in focusing of the infinite object point, at the telephoto position of the zoom lens in the third embodiment;

FIG. 16A is a front view showing a mobile phone of an example of the information processing apparatus in which the zoom optical system of the present invention is incorporated as the photographing optical system;

FIG. 16B is a side view showing the mobile phone of FIG. 16A; and

FIG. 16C is a sectional view showing the photographing optical system of the mobile phone of FIG. 16A.

DETAILED DESCRIPTION OF THE PREFERRED EMBODIMENTS

Figure 1A:
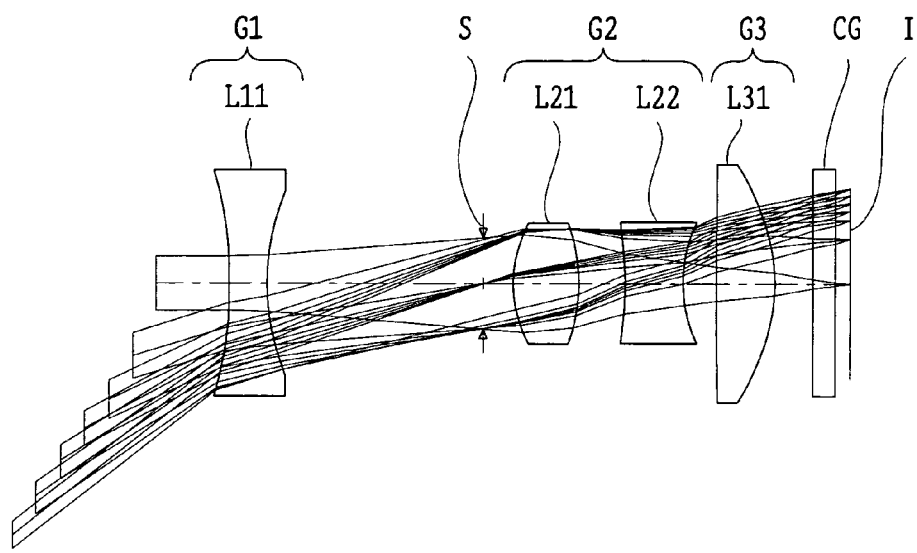
FIGS. 1A, 1B, and 1C are sectional views showing optical arrangements, developed along the optical axis, in focusing of an infinite object point, at wide-angle, middle, and telephoto positions, respectively, of a first embodiment of the zoom lens according to the present invention.

Before undertaking the description of the embodiments, the function and effect of the present invention will be explained.

The electronic imaging apparatus of the present invention uses the zoom lens comprising, in order from the object side, the first lens unit consisting of one negative lens component in which a plurality of lens elements are cemented to one another and the second lens unit provided with one negative lens component, having positive refracting power as a whole. In the zoom lens of this type, it is desirable that the first lens component and the second lens component are constructed with three lens components in total. Whereby, the thickness of the camera body where the lens barrel is collapsed can be reduced as far as possible.

In view of correction for aberration, the first lens unit has little influence on aberration (the fluctuation of aberration) even when its thickness is reduced. Thus, the thickness of the first lens unit is made as small as possible and thereby an effect of reducing the thickness of the camera body (the optical system) is brought about. Also, one lens component, as mentioned above, refers to a single or cemented lens, or a compound lens such that lens surfaces come in close contact with one another through resin, which is cured. Therefore, except for the single lens, the number of medium cementing surfaces is larger by one than that of lenses.

The zoom lens satisfies the following condition:

$$0.15 < t_1/f_W < 0.6 \quad (1)$$

where $t_1$ is the thickness, measured along the optical axis, of the first lens unit and fw is the focal length of the entire system at the wide-angle position of the zoom lens.

If the upper limit of Condition (1) is exceeded, it becomes difficult to decrease the thickness of the optical system where the lens barrel is collapsed. Below the lower limit of Condition (1), the thickness of the optical system will be extremely decreased. In this case, molding of each of the lenses becomes difficult. In the case of resin lenses, deformation is liable to be caused by a change of ambience after product assembly.

It is further desirable to satisfy the following condition:

$$0.18 < t_1/fw < 0.5 \qquad (1')$$

It is more desirable to satisfy the following condition:

$$0.20 < t_1/fw < 0.45 \qquad (1'')$$

It is good practice that the first lens unit has at least two aspherical surfaces so that object- and image-side surfaces are aspherical, in order to correct distortion and coma.

It is desirable that the first lens unit satisfies the following condition:

$$-0.5 < (R_{1F} + R_{1R})/(R_{1F} - R_{1R}) < 2 \qquad (2)$$

where $R_{1F}$ is the radius of curvature, measured along the optical axis, of the most object-side surface of the first lens unit and $R_{1R}$ is the radius of curvature, measured along the optical axis, of the most image-side surface of the first lens unit.

Beyond the upper limit of Condition (2), the overall length of the optical system in a working state is liable to increase. Below the lower limit of Condition (2), distortion and coma ceases to be allowable.

It is further desirable to satisfy the following condition:

$$0 < (R_{1F} + R_{1R})/(R_{1F} - R_{1R}) < 1.5 \qquad (2')$$

It is more desirable to satisfy the following condition:

$$0.3 < (R_{1F} + R_{1R})/(R_{1F} - R_{1R}) < 1 \qquad (2'')$$

Subsequently, reference is made to the second lens unit.

The second lens unit serves to carry out a magnification change and is most liable to produce aberration. It is therefore good practice that one of the lens elements constituting the second lens unit is configured so that both surfaces are aspherical.

In order to favorably correct aberration in the compact design, it is desirable to satisfy the following condition:

$$0.7 < t_2/fw < 1.6 \qquad (3)$$

where $t_2$ is a distance, measured along the optical axis, between the most object-side surface and the most image-side surface in the second lens unit and fw is the focal length of the entire system at the wide-angle position of the zoom lens.

Beyond the upper limit of Condition (3), it becomes difficult to decrease the thickness of the optical system where the lens barrel is collapsed. Below the lower limit of Condition (3), the second lens unit becomes insufficient in power and thus the overall length is liable to increase. Alternatively, correction for astigmatism becomes difficult.

It is further desirable to satisfy the following condition:

$$0.8 < t_2/fw < 1.4 \qquad (3')$$

It is more desirable to satisfy the following condition:

$$0.9 < t_2/fw < 1.2 \qquad (3'')$$

To reduce the overall length, the second lens unit includes, in order from the object side, the positive lens and the negative lens. In this case, when each of the positive lens and the negative lens has the refracting power of some degree, the overall length can be reduced. When the refracting power of the negative lens is determined here, the refracting power of the positive lens is also determined to some degree. As such, it is only necessary to define only the refracting power of the negative lens. It is desirable that the negative lens of the second lens unit satisfies the following condition:

$$0.6 < -f_{22}/f_2 < 2.0 \qquad (4)$$

where $f_{22}$ is the focal length of the negative lens in the second lens unit and $f_2$ is the combined focal length of the second lens unit.

Beyond the upper limit of Condition (4), the overall length is liable to increase and axial chromatic aberration is liable to be undercorrected. Below the lower limit of Condition (4), correction for spherical aberration or coma becomes difficult. In particular, when only the negative lens is moved independently in focusing, the amount of shift of a focal position against the amount of lens movement, that is, a focusing sensitivity is significantly improved. Consequently, the guarantee of accuracy becomes difficult.

It is further desirable to satisfy the following condition:

$$0.7 < -f_{22}/f_2 < 1.6 \qquad (4')$$

It is more desirable to satisfy the following condition:

$$0.8 < -f_{22}/f_2 < 1.2 \qquad (4'')$$

Next, the third lens unit will be explained. The third lens unit is placed behind the second lens unit and includes one positive lens component.

One of meanings of the existence of the third lens unit is to correct coma and distortion. Another is that the angle of emergence of a chief ray is reduced to moderate shading. In particular, coma and distortion are materially improved by introducing the aspherical surface into the third lens unit. However, one lens component, as mentioned above, refers to a single or cemented lens, or a compound lens such that resin is adhered to and cured on a lens surface.

The first lens unit and the second lens unit are moved in the magnification change and thereby a zoom function is performed for the present. Here, only when correction for aberration is incomplete, the third lens unit may be moved. However, since a reduction in the number of moving lens units is advantageous for compactness, it is good practice to fix the third lens unit in the magnification change.

It is desirable that the aspherical surface is introduced into the third lens unit in order to correct aberration. However, when the third lens unit is too close to the image plane, coma ceases to be corrected. It is thus necessary to keep some distance from the third lens unit to the image plane. Specifically, it is desirable that the zoom lens satisfies the following condition:

$$0.1 < fb/fw < 1.0 \qquad (5)$$

where fb is a distance from the third lens unit to the imaging surface of the image sensor and fw is the focal length of the entire system at the wide-angle position of the zoom lens.

Below the lower limit of Condition (5), correction for aberration becomes difficult. Beyond the upper limit of Condition (5), the overall length is increased, which is disadvantageous for a collapsible mount mechanism.

It is further desirable to satisfy the following condition:

$$0.2 < fb/fw < 0.8 \qquad (5')$$

It is more desirable to satisfy the following condition:

$$0.3 < fb/fw < 0.6 \quad (5'')$$

It is desirable that the third lens unit satisfies the following condition:

$$-1 < (R_{3F}+R_{3R})/(R_{3F}-R_{3R}) < 5 \quad (6)$$

where $R_{3F}$ is the radius of curvature, measured along the optical axis, of the most object-side surface of the third lens unit and $R_{3R}$ is the radius of curvature, measured along the optical axis, of the most image-side surface of the third lens unit.

Beyond the upper limit of Condition (6), it becomes hard to correct spherical aberration. Below the lower limit of Condition (6), it becomes hard to correct coma and distortion. As a result, it becomes difficult to exhibit its imaging performance within a practical limit.

It is further desirable to satisfy the following condition:

$$-0.5 < (R_{3F}+R_{3R})/(R_{3F}-R_{3R}) < 3 \quad (6')$$

It is more desirable to satisfy the following condition:

$$0 < (R_{3F}+R_{3R})/(R_{3F}-R_{3R}) < 2 \quad (6'')$$

In the zoom lens of the present invention, the number of components is extremely small, and thus chromatic aberration involved in the magnification change is liable to be produced. In this case, to correct chromatic aberration, the first lens unit is generally designed to include at least one negative lens and at least one positive lens. This design, however, materially increases the thickness in the direction of the optical axis.

Thus, in the present invention, at least one of the first lens unit and the third lens unit is constructed with a plurality of lens elements. Of the plurality of lens elements, each of lens elements other than that which is highest in Abbe's number is configured as an aspherical lens in which convergence increases progressively in going from the center to the periphery. This takes advantage of the fact that, in the first and third lens units, as magnification ratios are appreciably different, heights of off-axis chief rays are also appreciably different at the wide-angle and telephoto positions. In particular, the cementing surface has little influence on correction for aberration other than chromatic aberration. Hence, when the cementing surface is configured as the aspherical surface, a considerable effect is brought about.

Here, a description is given of one of means for using a plurality of lens elements and in addition, reducing the thickness of the optical system. This means is to provide ultraviolet curable resin on the aspherical lens as a base. In this case, one lens of ultraviolet curable resin is configured on the aspherical surface as the base. In particular, a lens using the ultraviolet curable resin, in contrast to an ordinary lens, has the advantage that its thickness can be considerably reduced.

Each of the first and third lens units is located away from the pupil of the optical system in accordance with the value of the focal length (for example, the wide-angle or telephoto position). With such a position of the lens unit, positions where rays pass through the lens surface vary with the angle of view. Specifically, an area through which the light beam passes, that is, an effective area of the lens, becomes nearly square.

Thus, when ultraviolet curable resin lenses are manufactured, their contours are made square. This offers the advantage that they are arrayed like checkers, that is, many ultraviolet curable resin lenses are configured like a sheet, and can be manufactures in a single molding operation. When this sheet is cut, many ultraviolet curable resin lenses can be easily obtained. Other manufacturing techniques may, of course, be used.

If the third lens unit is moved for focusing, aberration, notably astigmatism, will cause heavy fluctuation. It is undesirable that only the negative lens of the second lens unit is moved for focusing, because the maintenance of accuracy becomes difficult. Therefore, it is good practice that focusing of a shorter-distance object point is accomplished by shifting the first lens unit to the object side.

Each of the lens units in the zoom lens of the present invention is constructed with a minimum number of lens components, that is, one or two lens components. It is thus considered to use inhomogeneous media for the lenses. However, the use of the inhomogeneous media makes the lens manufacture difficult. In order to produce a preset effect for each lens, a certain thickness is required. Hence, it is desirable that the lenses are constructed with media that are relatively uniform in refractive index.

When the pixel size of the image sensor is reduced to an undue extent, components over the Nyquist rate are lost by the influence of diffraction. Thus, by utilizing this, an optical low-pass filter can be eliminated. This is favorable from the viewpoint that the thickness of the entire zoom lens is reduced as far as possible.

It is therefore desirable to satisfy the following condition:

$$Fw \leq a \text{ (μm)} \quad (7)$$

where $Fw$ is an open F-number at the wide-angle position and $a$ is a distance (μm) between pixels in the horizontal direction of the image sensor.

When Condition (7) is satisfied, it becomes unnecessary to place the optical low-pass filter in the optical path. As such, the optical system can be downsized.

Also, in the case where Condition (7) is satisfied, it is desirable that an aperture stop is only opened up from the viewpoint of securing the image quality. This is that the optical system in this case has the aperture stop which is always constant in diameter. In this optical system, the operation that the aperture stop is stopped down becomes unnecessary, and therefore a stop-down mechanism can be eliminated. The compact design of the optical system can be attained accordingly. Also, when Condition (7) is not satisfied, the optical low-pass filter is required.

It is further desirable to satisfy the following condition:

$$Fw \geq 1.2a \text{ (μm)} \quad (7')$$

It is more desirable to satisfy the following condition:

$$Fw \geq 1.4a \text{ (μm)} \quad (7'')$$

The zoom lens of the present invention comprises a plurality of lens units, with a stop between them, and a lens unit located on either the object or image side of the stop has a cementing surface, which is aspherical.

In the zoom lens of the present invention, it is desirable that the cementing surface is provided in the most object- or image-side lens unit.

In the zoom lens of the present invention, it is desirable that the most object-side lens unit has negative refracting power.

The zoom lens of the present invention comprises a plurality of lens units, with a stop between them, and each of one of lens units located on the object side of the stop and one of lens units on the image side of the stop has a cementing surface, which is aspherical.

In the zoom lens of the present invention, it s desirable that a lens unit, located on the object side of the stop, having the cementing surface is provided with negative refracting power, while a lens unit, located on the image side of the stop, having the cementing surface is provided with positive refracting power.

The zoom lens of the present invention comprises at least one lens unit with positive refracting power and at least one lens unit with negative refracting power. The at least one lens unit with positive and/or negative refracting power has a cementing surface, which is aspherical.

The zoom lens of the present invention may be constructed to consist of four lens components as a whole.

Finally, the electronic imaging apparatus will be described. In the electronic imaging apparatus, it is desirable that the slim design relative to the depth and the wide-angle design are compatible with each other.

Here, it is assumed that an infinite object has been imaged by an optical system free of distortion. In this case, a formed image is free of distortion and thus the following equation is established:

$$f = y/\tan \omega$$

where y is a height from the optical axis of an image point, f is the focal length of an imaging system, and ω is an angle made by the optical axis with the direction of an object point corresponding to an image point connecting the center of the imaging surface and the position of the height y.

On the other hand, when the optical system produces barrel distortion, the following condition is given:

$$f > y/\tan \omega$$

That is, if the values of the focal length f and the height y are constant, the angle ω takes a large value.

Thus, in the electronic imaging apparatus, it is good practice to intentionally use a zoom lens producing considerable barrel distortion, particularly with respect to the focal length in the proximity of the wide-angle position. In this case, the optical system dispense with correction for distortion and the wide-angle design of the optical system can be accomplished accordingly. However, the image of the object is formed on the electronic image sensor, with barrel distortion produced. Thus, the electronic imaging apparatus is such that image data derived from the electronic image sensor is processed by image processing. In this processing, the image data (the image profile) is changed so that barrel distortion is corrected. By doing so, the image data obtained finally has the profile very similar to the object. Therefore, it is only necessary to output the image of the object to a CRT and a printer on the basis of the image data.

Here, it is good practice to adopt the zoom lens satisfying, in focusing of a nearly infinite object point, the following condition:

$$0.7 < y_{07}/(f_w \cdot \tan \omega_{07w}) < 0.96 \quad (8)$$

where when a distance from the center to the farthest point (the maximum image height) on the effective imaging surface (the surface that imaging is possible) of the electronic image sensor is denoted by $y_{10}$, $y_{07} = 0.7 y_{10}$, and $\omega_{07w}$ is an angle made by the optical axis with the direction of an object point corresponding to an image point connecting the center of the imaging surface and the position of the distance $y_{07}$ at the wide-angle position.

Condition (8) mentioned above determines the degree of barrel distortion at the wide-angle position in zooming. When Condition (8) is satisfied, it becomes possible to fetch the information of a wide angle of view without making the optical system bulky. A barrel-distorted image is photoelectrically converted by the image sensor into barrel-distorted image data. In the barrel-distorted image data, however, processing corresponding to an electric profile change is applied by the signal processing system of the electronic image sensor. By doing so, even when the image data output finally is reproduced by a display device, distortion is corrected and an image very similar to the shape of the object is obtained.

If the upper limit of Condition (8) is exceeded, notably if the upper limit takes a value of approximately 1, correction corresponding to optically favorable correction for distortion can be made by image processing. However, it becomes difficult to fetch the image over a wide field angle while maintaining the compact design of the optical system. Below the lower limit of Condition (8), the enlargement ratio in a radial direction, of the periphery of the angle of view is too high when the distortion of the image caused by distortion of the optical system is corrected by image processing. Consequently, the deterioration of sharpness on the periphery of the image becomes pronounced.

When distortion is intentionally produced by the optical system so as to satisfy Condition (8) and the technique that the image is electrically processed after imaging by the electronic image sensor to correct distortion is introduced, the compact design and the wide-angle design (the angle of view in a vertical direction including distortion is set to at least 38°) of the optical system become possible.

It is further desirable to satisfy the following condition:

$$0.75 < y_{07}/(f_w \cdot \tan \omega_{07w}) < 0.94 \quad (8')$$

It is more desirable to satisfy the following condition:

$$0.80 < y_{07}/(f_w \cdot \tan \omega_{07w}) < 0.92 \quad (8'')$$

In the zoom lens of the present invention, the conditions and structural features, mentioned above, are individually satisfied or provided, and thereby the compact design or favorable correction for aberration can be attained. In the zoom lens of the present invention, the conditions and structural features can also be provided (satisfied) in combination with one another. In this case, a further compact design and favorable correction for aberration can be accomplished. The same holds for the electronic imaging apparatus provided with the zoom lens of the present invention.

Subsequently, the embodiments of the present invention will be described in accordance with the drawings.

First Embodiment

Figure 1B:
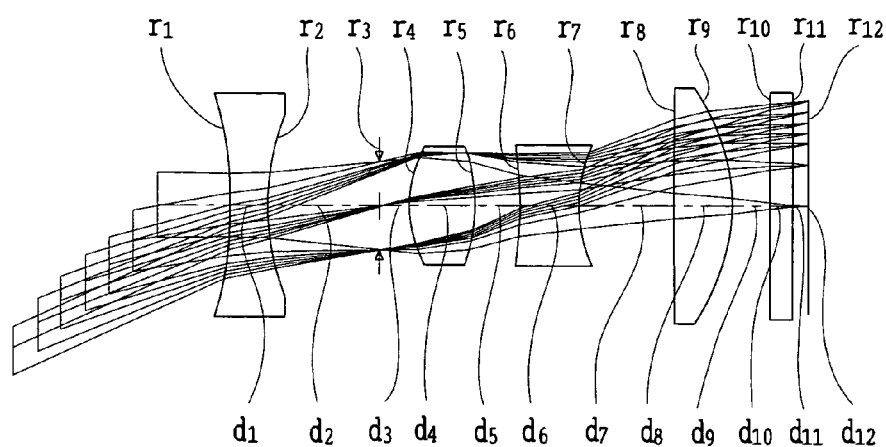
Figure 1C:
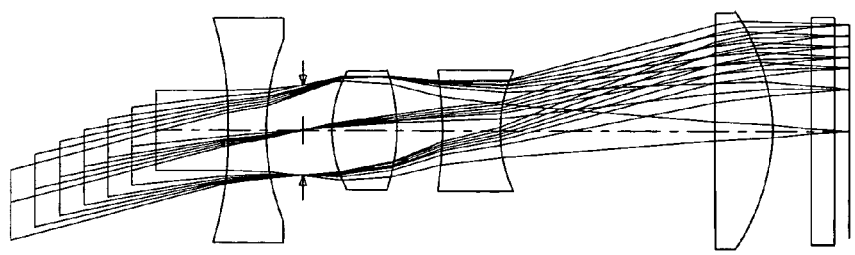

FIGS. 1A-1C show optical arrangements in the first embodiment of the zoom lens of the present invention. FIGS. 2A-2L show aberration characteristics of the zoom lens in the first embodiment. FIGS. 3A-3L show coma characteristics of the zoom lens in the first embodiment.

As shown in FIG. 1A, the zoom lens of the first embodiment comprises, in order from the object side, a first lens unit G1, an aperture stop S, a second lens unit G2, and a third lens unit G3. Also, in this figure, reference symbol CG represents a cover glass and I represents the imaging surface of the image sensor.

The first lens unit G1 is constructed with a biconcave lens L11. The second lens unit G2 includes a biconvex lens L21 and a biconcave lens L22, having positive refracting power as a whole. The third lens unit G3 is constructed with a biconvex lens L31.

When the magnification of the zoom lens is changed in the range from the wide-angle position to the telephoto position, the first lens unit G1, after being moved once toward the image side, is moved toward the object side. The second lens unit G2 is moved together with the aperture stop S toward the object side. The third lens unit G3 remains fixed.

The focusing operation of a short-distance object point is performed by moving the first lens unit G1 toward the object side.

Aspherical surfaces are applied to both surfaces of the biconcave lens L11 in the first lens unit G1, both surfaces of the biconvex lens L21 and the image-side surface of the biconcave lens L22 in the second lens unit G2, and the image-side surface of the biconvex lens L31 in the third lens unit G3.

Subsequently, numerical data of optical members constituting the zoom lens of the first embodiment are shown below.

Also, in the numerical data of the first embodiment, $r_1$, $r_2$, ... denote radii of curvature of individual lens surfaces; $d_1$, $d_2$, ... denote thicknesses of individual lenses or air spacings between them; $n_{d1}$, $n_{d2}$, ... denote refractive indices of individual lenses at the d line; $v_{d1}$, $v_{d2}$, ... denote Abbe's numbers of individual lenses; Fno denotes an F-number; f denotes the focal length of the entire system; and D0 denotes a distance from an object to a first surface.

Also, when z is taken as the coordinate in the direction of the optical axis, y is taken as the coordinate normal to the optical axis, K represents a conic coefficient, and $A_4$, $A_6$, $A_8$, and $A_{10}$ represent aspherical coefficients, the configuration of each of the aspherical surfaces is expressed by the following equation:

$$z=(y^2/r)/[1+\{1-(1+K)(y/r)^2\}^{1/2}]+A_4y^4+A_6y^6+A_8y^8+A_{10}y^{10}$$

These symbols hold for the numerical data of the embodiments to be described later.

Numerical Data 1

```
r1 = -35.1212 (aspherical surface)
   d1 = 0.8057      nd1 = 1.52542    vd1 = 55.78
r2 = 3.8887 (aspherical surface)
   d2 = D2
r3 = ∞ (stop)
   d3 = 0.6307
r4 = 2.4630 (aspherical surface)
   d4 = 1.3771      nd4 = 1.52542    vd4 = 55.78
r5 = -3.3002 (aspherical surface)
   d5 = 0.9651
r6 = -7.7807
   d6 = 1.2085      nd6 = 1.60687    vd6 = 27.03
r7 = 3.2153 (aspherical surface)
   d7 = D7
r8 = 232.0586
   d8 = 1.1990      nd8 = 1.52542    vd8 = 55.78
r9 = -3.1595 (aspherical surface)
   d9 = 0.8000
r10 = ∞
   d10 = 0.5000     nd10 = 1.51633   vd10 = 64.14
r11 = ∞
   d11 = D11
r12 = ∞ (imaging surface)
   d12 = 0
```

Aspherical Coefficients

First surface

K = 0
$A_2 = 0$     $A_4 = -2.0716 \times 10^{-2}$     $A_6 = 3.5101 \times 10^{-3}$
$A_8 = -2.0021 \times 10^{-4}$     $A_{10} = 0$
Second surface K = 0
$A_2 = 0$     $A_4 = -2.8820 \times 10^{-2}$     $A_6 = 7.0639 \times 10^{-3}$
$A_8 = -4.9068 \times 10^{-4}$     $A_{10} = 0$
Fourth surface K = -3.7238
$A_2 = 0$     $A_4 = 2.0100 \times 10^{-2}$     $A_6 = -9.0986 \times 10^{-4}$
$A_8 = 0$     $A_{10} = 0$
Fifth surface K = 0
$A_2 = 0$     $A_4 = 1.2516 \times 10^{-2}$     $A_6 = 2.7283 \times 10^{-3}$
$A_8 = -4.5918 \times 10^{-4}$     $A_{10} = 0$
Seventh surface K = 3.3200
$A_2 = 0$     $A_4 = -4.4575 \times 10^{-3}$     $A_6 = -4.7766 \times 10^{-3}$
$A_8 = 4.8172 \times 10^{-5}$     $A_{10} = 0$
Ninth surface K = -1.8885
$A_2 = 0$     $A_4 = 1.6837 \times 10^{-2}$     $A_6 = -4.0368 \times 10^{-3}$
$A_8 = 2.7254 \times 10^{-4}$     $A_{10} = 0$ Zoom Data When D0 (the distance from the object to the first surface) is ∞,

|  | Wide-angle | Middle | Telephoto |
| --- | --- | --- | --- |
| f (mm) | 3.12693 | 4.81086 | 8.05103 |
| Fno | 2.8201 | 3.5039 | 4.8293 |
| D2 | 4.57449 | 2.39301 | 0.77046 |
| D7 | 0.70324 | 2.00230 | 4.51175 |
| D11 | 0.30205 | 0.31424 | 0.30157 |

Second Embodiment

Figure 4A:
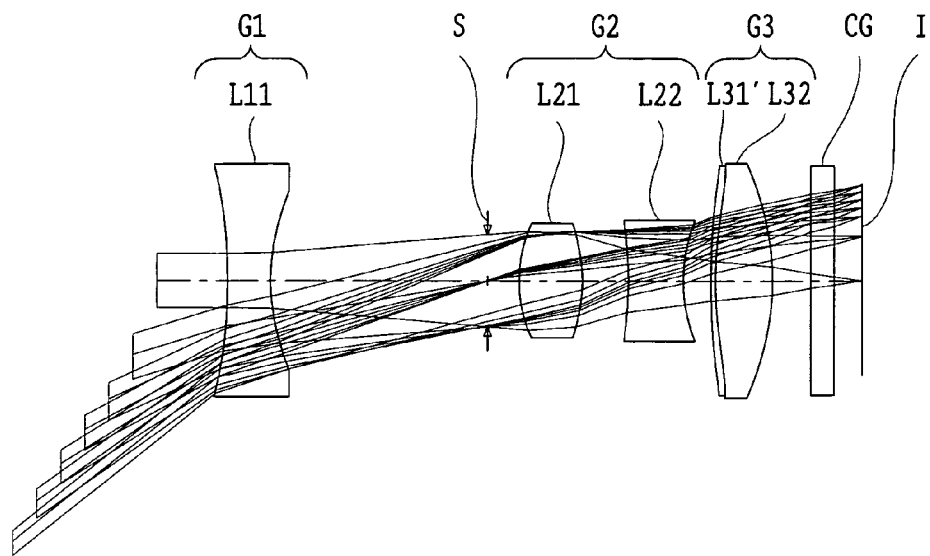
FIGS. 4A, 4B, and 4C are sectional views showing optical arrangements, developed along the optical axis, in focusing of an infinite object point, at wide-angle, middle, and telephoto positions, respectively, of a second embodiment of the zoom lens according to the present invention.
Figure 4B:
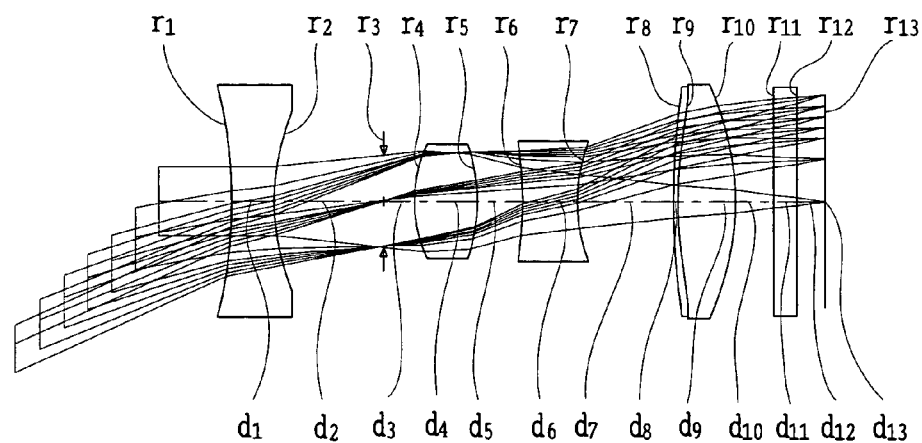
Figure 4C:
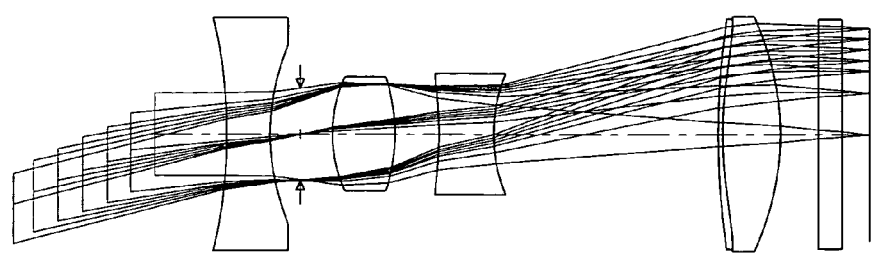

FIGS. 4A-4C show optical arrangements in the second embodiment of the zoom lens of the present invention. FIGS. 5A-5L show aberration characteristics of the zoom lens in the second embodiment. FIGS. 6A-6L show coma characteristics of the zoom lens in the second embodiment.

As shown in FIG. 4A, the zoom lens of the second embodiment comprises, in order from the object side, the first lens unit G1, the aperture stop S, the second lens unit G2, and the third lens unit G3. In this figure, again reference symbol CG represents a cover glass and I represents the imaging surface of the image sensor.

The first lens unit G1 is constructed with the biconcave lens L11. The second lens unit G2 includes the biconvex lens L21 and the biconcave lens L22, having positive refracting power as a whole. The third lens unit G3 is constructed with a cemented doublet of a negative meniscus lens L31' with a convex surface facing the object side and a biconvex lens L32, having positive refracting power as a whole.

When the magnification of the zoom lens is changed in the range from the wide-angle position to the telephoto position, the first lens unit G1, after being moved once toward the image side, is moved toward the object side. The second lens unit G2 is moved together with the aperture stop S toward the object side. The third lens unit G3 remains fixed.

The focusing operation of the short-distance object point is performed by moving the first lens unit G1 toward the object side.

Aspherical surfaces are applied to both surfaces of the biconcave lens L11 in the first lens unit G1, both surfaces of the biconvex lens L21 and the image-side surface of the biconcave lens L22 in the second lens unit G2, and a cementing surface between the negative meniscus lens L31' and the biconvex lens L32 and the image-side surface of the biconvex lens L32 in the third lens unit G3. The negative meniscus lens L31' is configured as an aspherical lens in which convergence increases progressively in going from the center to the periphery.

Subsequently, numerical data of optical members constituting the zoom lens of the second embodiment are shown below.

Numerical Data 2

$r_1 = -45.0080$ (aspherical surface)
$\quad d_1 = 0.8990 \quad n_{d1} = 1.52542 \quad \nu_{d1} = 55.78$
$r_2 = 3.9568$ (aspherical surface)
$\quad d_2 = D2$
$r_3 = \infty$ (stop)
$\quad d_3 = 0.6693$
$r_4 = 2.6162$ (aspherical surface)
$\quad d_4 = 1.3155 \quad n_{d4} = 1.52542 \quad \nu_{d4} = 55.78$
$r_5 = -3.3324$ (aspherical surface)
$\quad d_5 = 0.9734$
$r_6 = -8.5682$
$\quad d_6 = 1.1515 \quad n_{d6} = 1.60687 \quad \nu_{d6} = 27.03$
$r_7 = 3.4544$ (aspherical surface)
$\quad d_7 = D7$
$r_8 = 14.9964$
$\quad d_8 = 0.1000 \quad n_{d8} = 1.60687 \quad \nu_{d8} = 27.03$
$r_9 = 7.0000$ (aspherical surface)
$\quad d_9 = 1.2081 \quad n_{d9} = 1.52542 \quad \nu_{d8} = 55.78$
$r_{10} = -4.9165$ (aspherical surface)
$\quad d_{10} = 0.8000$
$r_{11} = \infty$
$\quad d_{11} = 0.5000 \quad n_{d11} = 1.51633 \quad \nu_{d8} = 64.14$
$r_{12} = \infty$
$\quad d_{12} = D12$
$r_{13} = \infty$ (imaging surface)
$\quad d_{13} = 0$ Aspherical Coefficients First surface $K = 0$
$A_2 = 0 \quad A_4 = -1.6114 \times 10^{-2} \quad A_6 = 2.4254 \times 10^{-3}$
$A_8 = -1.2403 \times 10^{-4} \quad A_{10} = 0$ Second surface $K = 0$
$A_2 = 0 \quad A_4 = -2.2120 \times 10^{-2} \quad A_6 = 4.9977 \times 10^{-3}$
$A_8 = -3.1633 \times 10^{-4} \quad A_{10} = 0$ Fourth surface $K = -3.6667$
$A_2 = 0 \quad A_4 = 1.4880 \times 10^{-2} \quad A_6 = -1.9691 \times 10^{-3}$
$A_8 = 0 \quad A_{10} = 0$ Fifth surface $K = 0$
$A_2 = 0 \quad A_4 = 1.1657 \times 10^{-2} \quad A_6 = -2.7078 \times 10^{-3}$
$A_8 = 1.0504 \times 10^{-3} \quad A_{10} = 0$ Seventh surface $K = 3.2972$
$A_2 = 0 \quad A_4 = -1.1181 \times 10^{-2} \quad A_6 = 2.4364 \times 10^{-3}$ -continued $A_8 = -8.9622 \times 10^{-4} \quad A_{10} = 0$ Ninth surface $K = 0$
$A_2 = 0 \quad A_4 = -6.0000 \times 10^{-3} \quad A_6 = 0$
$A_8 = 0 \quad A_{10} = 0$ Tenth surface $K = -1.8635$
$A_2 = 0 \quad A_4 = 1.6675 \times 10^{-3} \quad A_6 = 2.1495 \times 10^{-4}$
$A_8 = -3.9340 \times 10^{-5} \quad A_{10} = 0$ Zoom Data When D0 (the distance from the object to the first surface) is $\infty$,

|  | Wide-angle | Middle | Telephoto |
|---|---|---|---|
| f (mm) | 3.27459 | 5.06808 | 8.46658 |
| Fno | 2.8347 | 3.5042 | 4.8166 |
| D2 | 4.59902 | 2.33423 | 0.65744 |
| D7 | 0.57830 | 2.02210 | 4.71846 |
| D12 | 0.58496 | 0.57612 | 0.58491 |

Third Embodiment

Figure 7A:
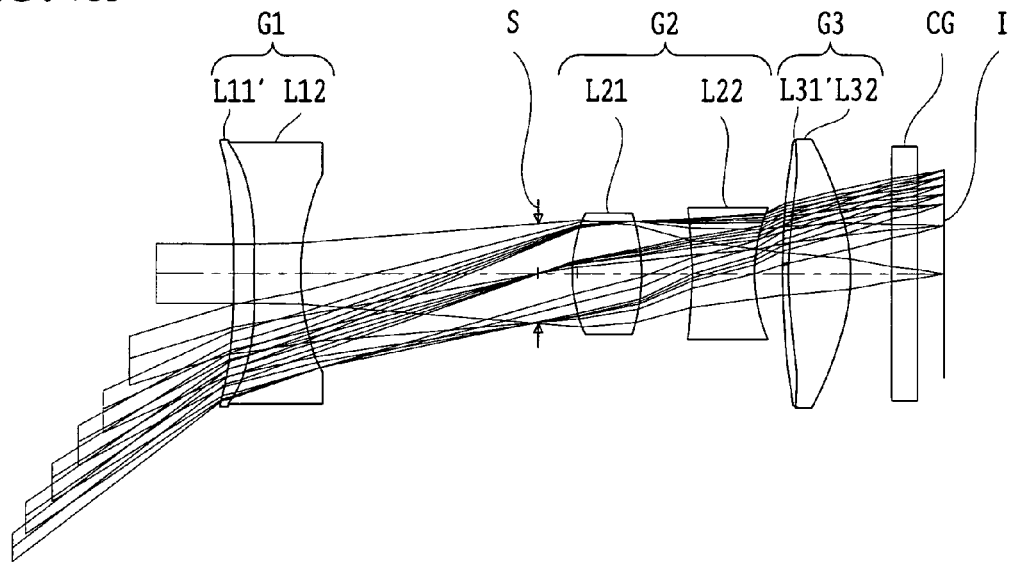
FIGS. 7A, 7B, and 7C are sectional views showing optical arrangements, developed along the optical axis, in focusing of an infinite object point, at wide-angle, middle, and telephoto positions, respectively, of a third embodiment of the zoom lens according to the present invention.
Figure 7B:
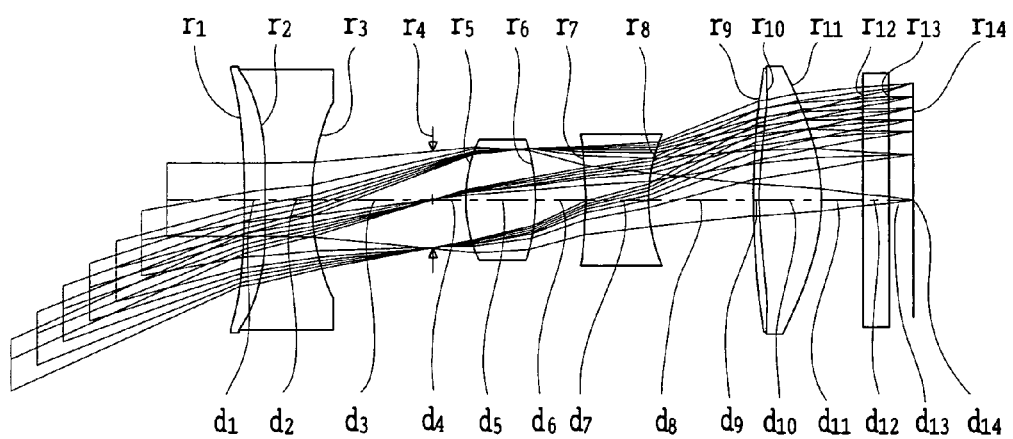
Figure 7C:
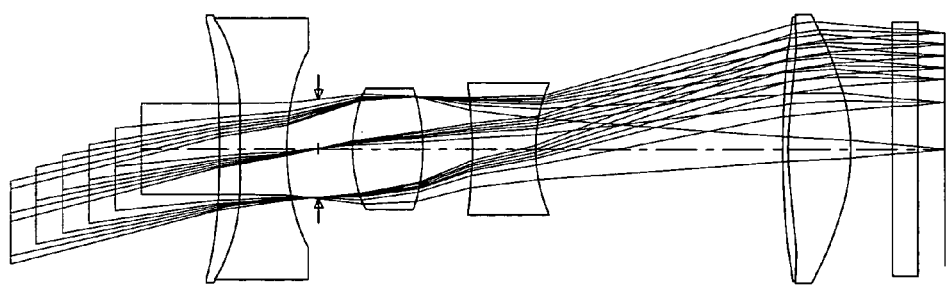

FIGS. 7A-7C show optical arrangements in the third embodiment of the zoom lens of the present invention. FIGS. 8A-8L show aberration characteristics of the zoom lens in the third embodiment. FIGS. 9A-9L show coma characteristics of the zoom lens in the third embodiment.

As shown in FIG. 7A, the zoom lens of the third embodiment comprises, in order from the object side, the first lens unit G1, the aperture stop S, the second lens unit G2, and the third lens unit G3. In this figure, again reference symbol CG represents a cover glass and I represents the imaging surface of the image sensor.

The first lens unit G1 is constructed with a cemented doublet of an aspherical lens L11' whose object-side surface is concave toward the object side and whose image-side surface is concave toward the image side at the lens middle and convex toward the image side on the lens periphery and an aspherical lens L12 whose object-side surface is convex toward the object side of the lens middle and concave toward the object side on the lens periphery and whose image-side surface is concave toward the image side, having negative refracting power as a whole. The second lens unit G2 includes the biconvex lens L21 and the biconcave lens L22, having positive refracting power as a whole. The third lens unit G3 is constructed with a cemented doublet of the negative meniscus lens L31' with a convex surface facing the object side and the biconvex lens L32, having positive refracting power as a whole.

When the magnification of the zoom lens is changed in the range from the wide-angle position to the telephoto position, the first lens unit G1, after being moved once toward the image side, is moved toward the object side. The second lens unit G2 is moved together with the aperture stop S toward the object side. The third lens unit G3 remains fixed.

The focusing operation of the short-distance object point is performed by moving the first lens unit G1 toward the object side.

Aspherical surfaces are applied to all surfaces of the aspherical lenses L11' and L12 in the first lens unit G1, both surfaces of the biconvex lens L21 and the image-side surface of the biconcave lens L22 in the second lens unit G2, and the cementing surface between the negative meniscus lens L31' and the biconvex lens L32 and the image-side surface of the biconvex lens L32 in the third lens unit G3. Each of the aspherical lenses L11' and the negative meniscus lens L31' is configured as an aspherical lens in which convergence increases progressively in going from the center to the periphery.

Subsequently, numerical data of optical members constituting the zoom lens of the third embodiment are shown below.

Numerical Data 3

$r_1 = -66.0069$ (aspherical surface)
$\quad d_1 = 0.4000 \quad n_{d1} = 1.60687 \quad \nu_{d1} = 27.03$
$r_2 = 1996.5066$ (aspherical surface)
$\quad d_2 = 0.9000 \quad n_{d2} = 1.52542 \quad \nu_{d2} = 55.78$
$r_3 = 4.0125$ (aspherical surface)
$\quad d_3 = D3$
$r_4 = \infty$ (stop)
$\quad d_4 = 0.6563$
$r_5 = 2.5696$ (aspherical surface)
$\quad d_5 = 1.3432 \quad n_{d5} = 1.52542 \quad \nu_{d5} = 55.78$
$r_6 = -3.4415$ (aspherical surface)
$\quad d_6 = 0.9845$
$r_7 = -8.1032$
$\quad d_7 = 1.2113 \quad n_{d7} = 1.60687 \quad \nu_{d7} = 27.03$
$r_8 = 3.3418$ (aspherical surface)
$\quad d_8 = D8$
$r_9 = 15.8235$
$\quad d_9 = 0.1000 \quad n_{d9} = 1.60687 \quad \nu_{d7} = 27.03$
$r_{10} = 6.9465$ (aspherical surface)
$\quad d_{10} = 1.1972 \quad n_{d10} = 1.52542 \quad \nu_{d10} = 55.78$
$r_{11} = -3.8090$ (aspherical surface)
$\quad d_{11} = 0.8000$
$r_{12} = \infty$
$\quad d_{12} = 0.5000 \quad n_{d12} = 1.51633 \quad \nu_{d10} = 64.14$
$r_{13} = \infty$
$\quad d_{13} = D13$
$r_{14} = \infty$
$\quad d_{14} = 0$ Aspherical Coefficients First surface $K = 0$
$A_2 = 0 \quad A_4 = -1.1328 \times 10^{-2} \quad A_6 = 1.5240 \times 10^{-3}$
$A_8 = -8.1836 \times 10^{-5} \quad A_{10} = 0$
Second surface $K = 0$
$A_2 = 0 \quad A_4 = -2.0000 \times 10^{-2} \quad A_6 = 1.8548 \times 10^{-3}$
$A_8 = -1.1687 \times 10^{-4} \quad A_{10} = 0$
Third surface $K = 0$
$A_2 = 0 \quad A_4 = -1.6210 \times 10^{-2} \quad A_6 = 4.5973 \times 10^{-3}$
$A_8 = -3.9298 \times 10^{-4} \quad A_{10} = 0$
Fifth surface $K = -3.6735$
$A_2 = 0 \quad A_4 = 1.5546 \times 10^{-2} \quad A_6 = -1.6898 \times 10^{-3}$
$A_8 = 0 \quad A_{10} = 0$
Sixth surface $K = 0$
$A_2 = 0 \quad A_4 = 8.8169 \times 10^{-3} \quad A_6 = 7.8395 \times 10^{-4}$
$A_8 = -4.7145 \times 10^{-4} \quad A_{10} = 0$ -continued Eighth surface $K = 3.2912$
$A_2 = 0 \quad A_4 = -1.0175 \times 10^{-2} \quad A_6 = 2.1986 \times 10^{-3}$
$A_8 = -1.0915 \times 10^{-3} \quad A_{10} = 0$
Tenth surface $K = 0$
$A_2 = 0 \quad A_4 = -8.0000 \times 10^{-3} \quad A_6 = 0$
$A_8 = 0 \quad A_{10} = 0$
Eleventh surface $K = -1.8636$
$A_2 = 0 \quad A_4 = 1.6784 \times 10^{-3} \quad A_6 = 2.1725 \times 10^{-4}$
$A_8 = -3.6642 \times 10^{-5} \quad A_{10} = 0$ Zoom Data When D0 (the distance from the object to the first surface) is $\infty$,

|  | Wide-angle | Middle | Telephoto |
|---|---|---|---|
| f (mm) | 3.23138 | 5.03143 | 8.45392 |
| Fno | 2.8455 | 3.5768 | 4.9351 |
| D3 | 4.59091 | 2.31694 | 0.62178 |
| D8 | 0.54016 | 2.04018 | 4.81213 |
| D13 | 0.51571 | 0.49149 | 0.51551 |

Next, values of parameters of the conditions in the embodiments mentioned above are listed in Table 1.

TABLE 1

|  | 1st embodiment | 2nd embodiment | 3rd embodiment |
|---|---|---|---|
| $y_{10}$ (Maximum image height) | 2.25 | 2.25 | 2.25 |
| Half angle of view corresponding to $y_{10} \times 0.6$ (Note 1) | 24.9 | 24.9 | 24.9 |
| Half angle of view at wide-angle position (Note 1) | 37.7 | 37.8 | 37.7 |
| Half angle of view at middle position | 25.0 | 24.9 | 24.6 |
| Half angle of view at telephoto position | 15.0 | 14.7 | 14.7 |
| $t_1/fw$ | 0.25766 | 0.27454 | 0.40230 |
| $(R_{1F} + R_{1R})/(R_{1F} - R_{1R})$ | 0.80063 | 0.83838 | 0.88539 |
| $t_2/fw$ | 1.13552 | 1.05064 | 1.09520 |
| $-f_{22}/f_2$ | 0.92780 | 0.95551 | 0.90962 |
| fb/fw | 0.45790 | 0.52364 | 0.50922 |
| $(R_{3F} + R_{3R})/(R_{3F} - R_{3R})$ | 0.97314 | 0.50620 | 0.61197 |
| $y_{07}$ | 1.575 | 1.575 | 1.575 |
| $y_{07}/(fw \cdot \tan \omega_{07w})$ (Note 2) | 0.88986 | 0.84330 | 0.86480 |
| a (μm) | 2.8 | 2.25 | 1.8 |
| Fw/a | 1.0072 | 1.2599 | 1.5808 |

(Note 1)
The half angle of view corresponding to the maximum image height $y_{10}$ refers to a value including distortion, but each of the embodiments is based on the premise that distortion produced in the proximity of the wide-angle position is corrected by image processing, and thus the half angle of view after correction for distortion is described.
In particular, this description is given of the case where correction is made so that the half angle of view corresponding to the image height $y_{06}$ is not practically changed. (That is, the maximum image height is not uniformly obtained in the entire variable magnification range. The image height is reduced in the proximity of the wide-angle position.)
(Note 2)
The calculated value before correction for distortion is described.

The zoom optical system of the present invention mentioned above can be used in the photographing apparatus in which the image of the object is formed by the imaging optical system, such as the zoom lens, and is received by the image sensor, such as a CCD or CMOS, to photograph, notably in a digital camera or a video camera; a personal computer, a telephone, or a personal digital assistant which is an example of an information processing apparatus; and a mobile phone that is handy to carry. The embodiments of such apparatuses are shown below.

Figure 10:
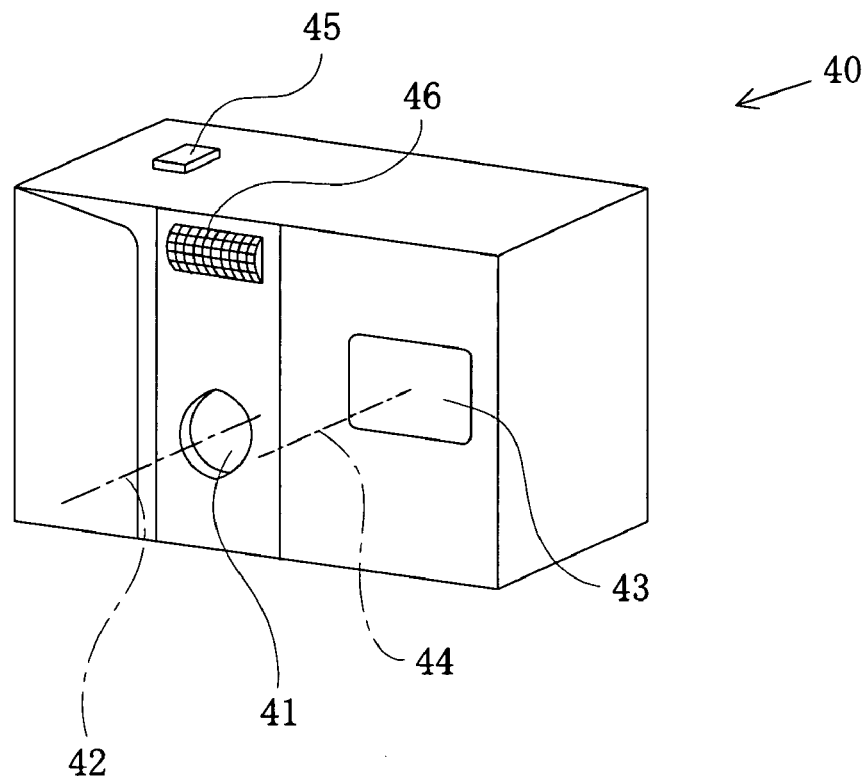
FIG. 10 is a perspective front view showing the appearance of a digital camera incorporating the zoom optical system of the present invention.
Figure 11:
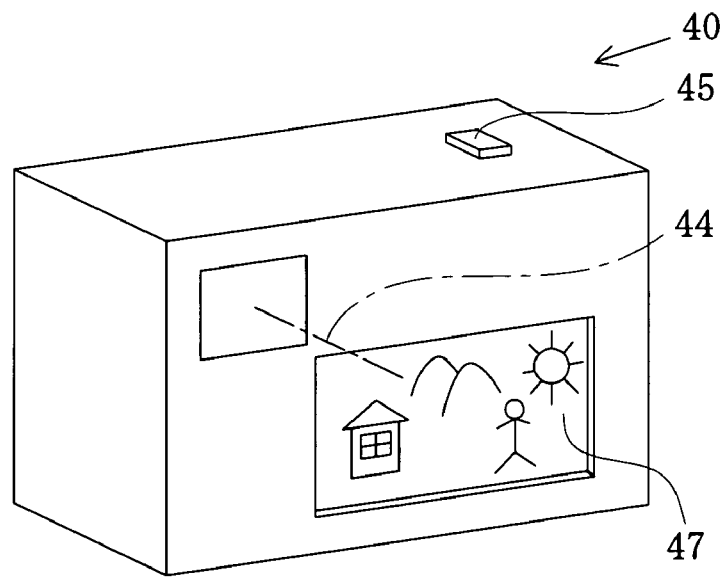
FIG. 11 is a perspective rear view showing the digital camera of FIG. 10.
Figure 12:
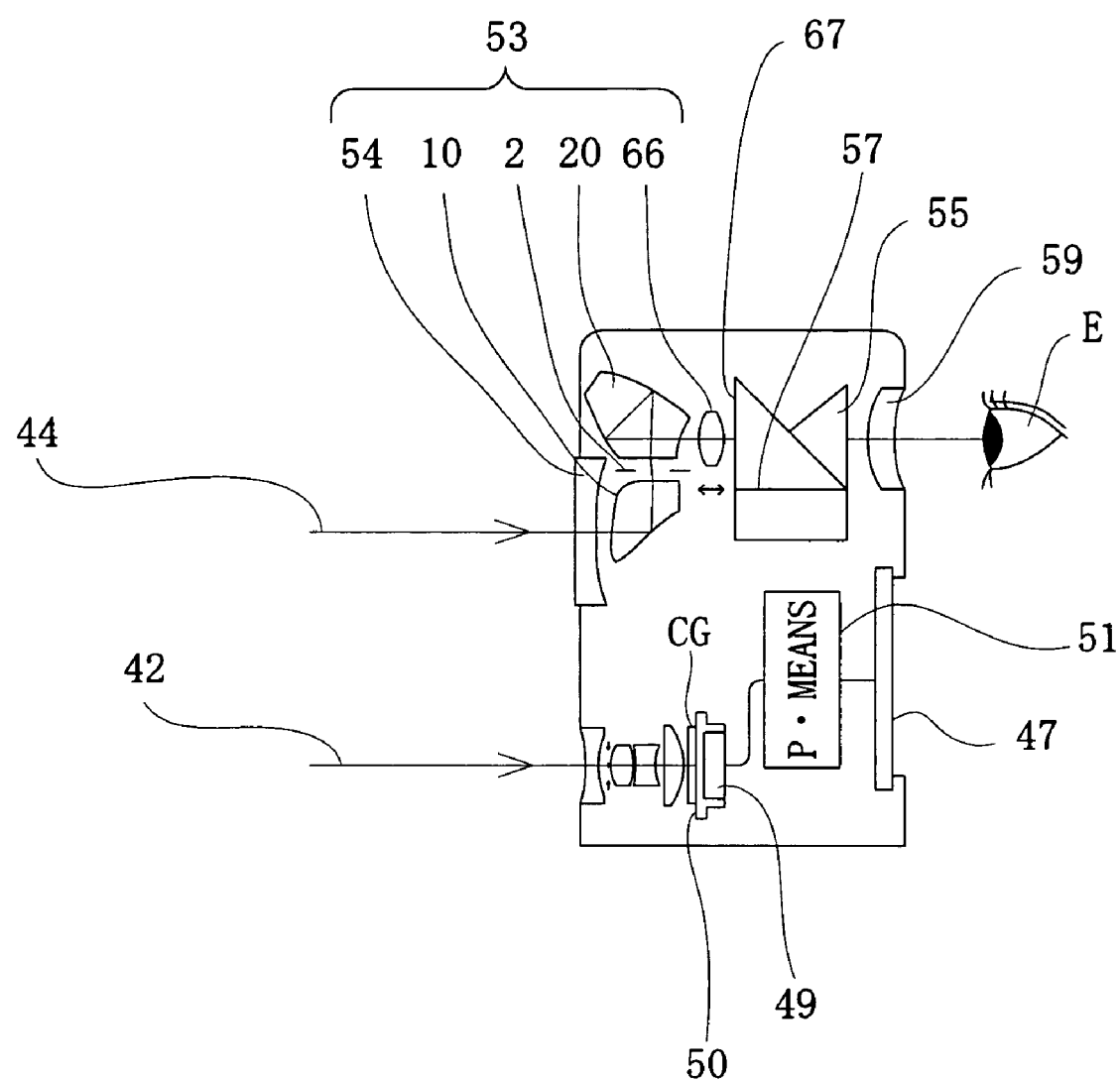
FIG. 12 is a sectional view showing the optical arrangement of the digital camera of FIG. 10.

FIGS. 10-12 illustrate a digital camera in which the zoom lens of the present invention is incorporated in a photographing optical system 41. FIGS. 10 and 11 show the appearance of a digital camera 40, and FIG. 12 shows the optical arrangement of the digital camera 40.

The digital camera 40, in this example, includes the photographing optical system 41 having a photographing optical path 42, a finder optical system 43 having a finder optical path 44, a shutter button 45, a flash lamp 46, and a liquid crystal display monitor 47. When a photographer pushes the shutter button 45 provided on the upper face of the camera 40, photographing is performed, in association with this shutter operation, through the photographing optical system 41, for example, the zoom optical system of the first embodiment.

An object image formed by the photographing optical system 41 is brought onto the imaging surface of a CCD 49. The object image received by the CCD 49 is displayed as an electronic image on the liquid crystal display monitor 47 provided on the back face of the camera, through a processing means 51. A memory and the like are placed in this processing means 51 so that a photographed electronic image can be recorded. Also, the memory may be provided to be independent of the processing means 51, or may be constructed so that the image is electronically recorded and written by a floppy disk, memory card, or MO.

A finder objective optical system 53 is located on the finder optical path 44. The finder objective optical system 53 includes a cover lens 54, a first prism 10, an aperture stop 2, a second prism 20, and a focus lens 66. By the finder objective optical system 53, an object image is formed on an image-forming surface 67. The object image is provided on a field frame 57 of a Porro prism 55 which is an image erecting member. Behind the Porro prism 55, an eyepiece optical system 59 introducing an erect image into an observer's eye E is located.

According to the digital camera 40 constructed as mentioned above, the electronic imaging apparatus that has the zoom lens of the compact and slim design in which the number of constituents of the photographing optical system 41 is lessened can be realized.

Figure 13:
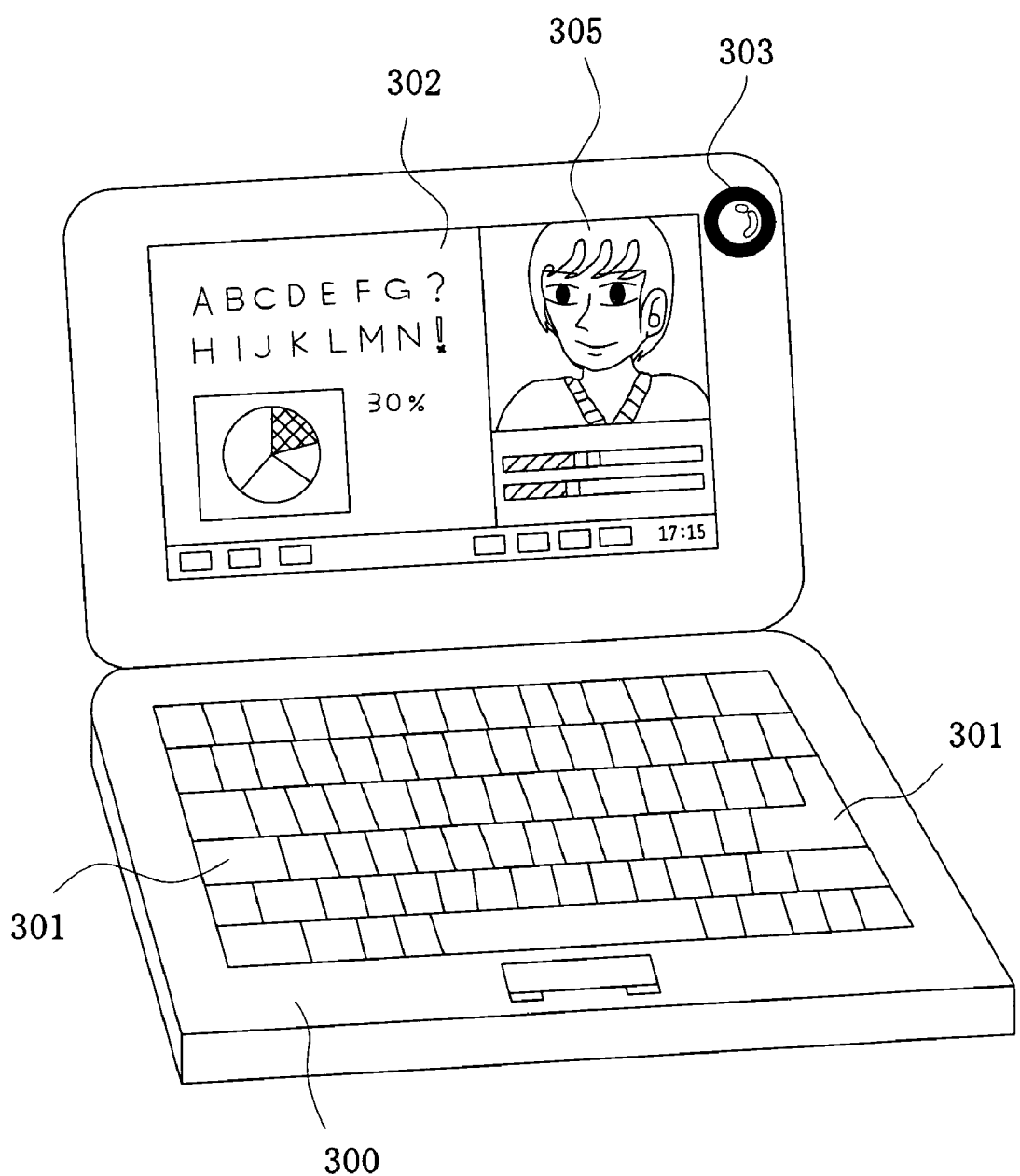
FIG. 13 is a perspective front view showing a personal computer as an example of an information processing apparatus in which the zoom optical system of the present invention is incorporated as an objective optical system.
Figure 14:
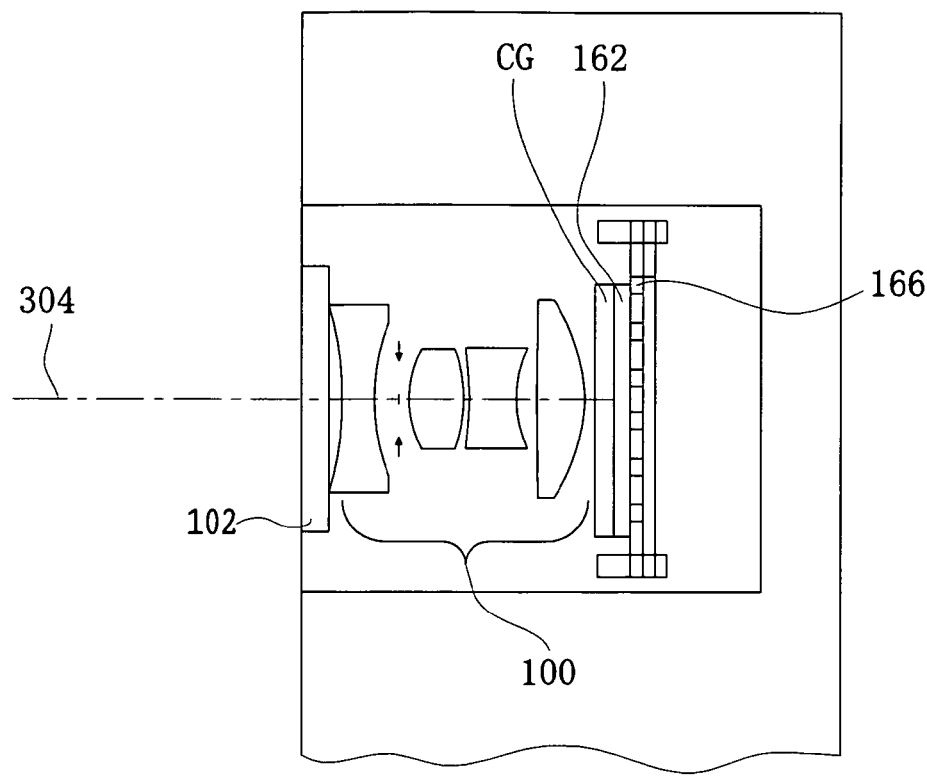
FIG. 14 is a sectional view showing the photographing optical system incorporated in the personal computer of FIG. 13.
Figure 15:
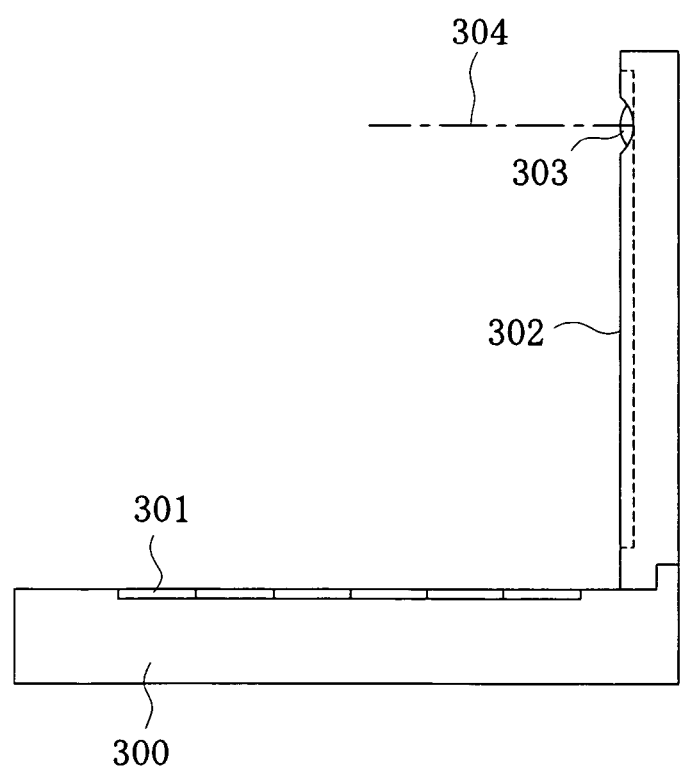
FIG. 15 is a side view showing the personal computer of FIG. 13.

Subsequently, a personal computer of an example of an information processing apparatus in which the zoom optical system of the present invention is incorporated as an objective optical system is illustrated in FIGS. 13-15. FIGS. 13 and 15 show a state where the cover of a personal computer 300 is opened, and FIG. 14 shows a photographing optical system 303 of the personal computer 300. The personal computer 300, as shown in FIGS. 13-15, has a keyboard 301, an information processing means or a recording means, a monitor 302, and the photographing optical system 303.

Here, the keyboard 301 is provided for the purpose that an operator inputs information from the exterior. The information processing means and the recording means are eliminated from the figures. The monitor 302 is to display information for the operator. The photographing optical system 303 is to photograph the operator himself or surrounding images. The monitor 302 may be a liquid crystal display element or a CRT display. The liquid crystal display element refers to a transmission-type liquid crystal display element illuminated with backlight, not shown, from the back face, or a reflection-type liquid crystal display element reflecting light from the front for display. In these figures, the photographing optical system 303 is housed in the monitor 302 upper-right, but it may be located at any place, such as the periphery of the monitor 302 or of the keyboard 301.

The photographing optical system 303 has an objective lens 100 including the zoom optical system of the present invention and an imaging element chip 162 receiving an image, on a photographing optical path 304. These are housed in the personal computer 300. At the top of a lens frame, a cover glass 102 for protecting the objective lens 100 is placed.

An object image received by the chip 162 is input into the processing means of the personal computer 300 through a terminal 166. The object image is finally displayed as an electronic image on the monitor 302. In FIG. 13, an image 305 photographed by the operator is shown as an example. The image 305 can also be displayed on the personal computer of his communication mate from a remote place through the processing means. To transmit the image to the remote place, the internet or the telephone is utilized.

FIGS. 16A-16C illustrate a telephone of another example of the information processing apparatus in which the zoom optical system of the present invention is housed as the photographing optical system, notably a mobile phone that is handy to carry. FIGS. 16A and 16B show a mobile phone 400, and FIG. 16C shows a photographing optical system 405 of the mobile phone 400. A mobile phone 400, as shown in FIGS. 16A-16C, includes a microphone section 401, a speaker section 402, input dials 403, a monitor 404, the photographing optical system 405, an antenna 406, and a processing means.

Here, the microphone section 401 is used to input an operator's voice as information. The speaker section 402 is to output the voice of a communication mate. The input dials 403 are used for the purpose that an operator inputs information. The monitor 404 displays information, such as photographing images of the operator himself and the communication mate, and such as telephone numbers. The antenna 406 is used to transmit and receive electric waves for communication. The processing means (not shown) processes image information, communication information, and an input signal.

Here, the monitor 404 is a liquid crystal display element. In these figures, the arrangement of individual parts is not limited to the above description. The photographing optical system 405 has the objective lens 100 with the zoom optical system of the present invention and the imaging element chip 162 receiving the object image, arranged on a photographing optical path 407. These are incorporated in the mobile phone 400. At the top of the lens frame, a cover glass 102 for protecting the objective lens 100 is placed.

The object image received by the chip 162 is input into the processing means, not shown, through the terminal 166. The object image is finally displayed as the electronic image on either the monitor 404 or the monitor of the communication mate, or both. Also, the processing means includes a signal processing function. When the image is transmitted to the communication mate, the information of the object image received by the chip 162 is converted into a transmittable signal by the signal processing function.

What is claimed is:

1. A zoom lens comprising, in order from an object side:
   a first lens unit consisting of one negative lens component; and
   a second lens unit including one negative lens component and having positive refracting power as a whole,
   where one lens component denotes a single lens, a cemented lens having a cementing surface or a compound lens having an adhering-and-curing surface to which resin is adhered and cured.
   wherein the zoom lens satisfies the following condition:

$0.15 < t_1/fw < 0.6$ where $t_1$ is a thickness, measured along an optical axis, of the first lens unit, and fw is a focal length of an entire system at a wide-angle position of the zoom lens,
   wherein the negative lens component of the first lens unit includes a plurality of lens elements and is constructed as a cemented lens having a cementing surface or a compound lens having an adhering-and-curing surface, and
   wherein the cementing surface or the adhering-and-curing surface of the first lens unit is made aspherical.

2. A zoom lens according to claim 1, further satisfying the following condition:

$-0.5 < (R_{1F}+R_{1R})/(R_{1F}-R_{1R}) < 2$ where $R_{1F}$ is a radius of curvature, measured along the optical axis, of a most object-side surface of the first lens unit and $R_{1R}$ is a radius of curvature, measured along the optical axis, of a most image-side surface of the first lens unit.

3. A zoom lens according to claim 1, wherein both surfaces of at least one lens element constituting the second lens unit are aspherical.

4. A zoom lens according to claim 1, further satisfying the following condition:

$0.7 < t_2/fw < 1.6$ where $t_2$ is a distance, measured along the optical axis, between a most object-side surface and a most image-side surface in the second lens unit.

5. A zoom lens according to claim 1, further comprising a third lens unit including one positive lens component on an image side of the second lens unit.

6. A zoom lens according to claim 5, wherein the third lens unit remains fixed when a magnification of the zoom lens is changed.

7. A zoom lens according to claim 5, further satisfying the following condition:

$0.1 < fb/fw < 1.0$ where fb is a distance from the third lens unit to an imaging surface.

8. A zoom lens according to claim 5, further satisfying the following condition:

$-1 < (R_{3F}+R_{3R})/(R_{3F}-R_{3R}) < 5$ where $R_{3F}$ is a radius of curvature, measured along the optical axis, of a most object-side surface of the third lens unit and $R_{3R}$ is a radius of curvature, measured along the optical axis, of a most image-side surface of the third lens unit.

9. A zoom lens according to claim 5, further satisfying the following condition:

$0.2 < fb/fw < 0.8$ where fb is a distance from the third lens unit to an imaging surface.

10. A zoom lens according to claim 5, further satisfying the following condition:

$0.3 < fb/fw < 0.6$ where fb is a distance from the third lens unit to an imaging surface.

11. A zoom lens according to claim 5, further satisfying the following condition:

$-0.5 < (R_{3F}+R_{3R})/(R_{3F}-R_{3R}) < 3$ where $R_{3F}$ is a radius of curvature, measured along the optical axis, of a most object-side surface of the third lens unit and $R_{3R}$ is a radius of curvature, measured along the optical axis, of a most image-side surface of the third lens unit.

12. A zoom lens according to claim 5, further satisfying the following condition:

$0 < (R_{3F}+R_{3R})/(R_{3F}-R_{3R}) < 2$ where $R_{3F}$ is a radius of curvature, measured along the optical axis, of a most object-side surface of the third lens unit and $R_{3R}$ is a radius of curvature, measured along the optical axis, of a most image-side surface of the third lens unit.

13. A zoom lens according to claim 1, wherein focusing onto a shorter-distance object point is accomplished by shifting the first lens unit to the object side.

14. A zoom lens according to claim 1, wherein media of lens elements constituting individual lens units have an approximately uniform refractive index.

15. A zoom lens according to claim 1, further comprising a third lens unit including one positive lens component provided with an aspherical surface on an image side of the second lens unit.

16. A zoom lens according to claim 1, further satisfying the following condition:

$0.18 < t_1/fw < 0.5$.

17. A zoom lens according to claim 1, further satisfying the following condition:

$0.20 < t_1/fw < 0.45$.

18. A zoom lens according to claim 1, further satisfying the following condition:

$0 < (R_{1F}+R_{1R})/(R_{1F}-R_{1R}) < 1.5$ where $R_{1F}$ is a radius of curvature, measured along the optical axis, of a most object-side surface of the first lens unit and $R_{1R}$ is a radius of curvature, measured along the optical axis, of a most image-side surface of the first lens unit.

19. A zoom lens according to claim 1, further satisfying the following condition:

$0.8 < t_2/fw < 1.4$ where $t_2$ is a distance, measured along the optical axis, between a most object-side surface and a most image-side surface in the second lens unit.

20. A zoom lens according to claim 1, further satisfying the following condition:

$0.9 < t_2/fw < 1.2$ where $t_2$ is a distance, measured along the optical axis, between a most object-side surface and a most image-side surface in the second lens unit.

21. A zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following condition:

$$0.15 < t_1/fw < 0.6$$

where $t_1$ is a thickness, measured along an optical axis, of the first lens unit, and fw is a focal length of an entire system at a wide-angle position of the zoom lens,
wherein the negative lens component of the first lens unit includes a plurality of lens elements and is constructed as a cemented lens having a cementing surface or a compound lens having an adhering-and-curing surface, and
wherein the first lens unit has at least two aspherical surfaces.

22. A zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following conditions:

$$0.15 < t_1/fw < 0.6$$

$$0.6 < -f_{22}/f_2 < 2.0$$

where $t_1$ is a thickness, measured along an optical axis, of the first lens unit, fw is a focal length of an entire system at a wide-angle position of the zoom lens, $f_{22}$ is a focal length of the negative lens component in the second lens unit, and $f_2$ is a combined focal length of the second lens unit, and
wherein the negative lens component of the first lens unit includes a plurality of lens elements and is constructed as a cemented lens having a cementing surface or a compound lens having an adhering-and-curing surface.

23. A zoom lens comprising, in order from an object side:
a first lens unit consisting of one negative lens component;
a second lens unit including one negative lens component and having positive refracting power as a whole; and
a third lens unit including one positive lens component on an image side of the second lens unit,
where one lens component denotes a single lens, a cemented lens having a cementing surface or a compound lens having an adhering-and-curing surface to which resin is adhered and cured,
wherein the zoom lens satisfies the following condition:

$$0.15 < t_1/fw < 0.6$$

where $t_1$ is a thickness, measured along an optical axis, of the first lens unit, and fw is a focal length of an entire system at a wide-angle position of the zoom lens, and
wherein the first lens unit or the third lens unit includes a plurality of lens elements, each of which other than a lens element having a highest Abbe's number is an aspherical lens in which convergence increases progressively in going from a center to a periphery thereof.

24. An electronic imaging apparatus comprising:
a zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured; and
an electronic image sensor located on an image side of a most image-side lens unit of the zoom lens,
wherein the zoom lens satisfies the following condition:

$$0.15 < t_1/fw < 0.6$$

where $t_1$ is a thickness, measured along an optical axis, of the first lens unit, and fw is a focal length of an entire system at a wide-angle position of the zoom lens,
wherein image data corresponding to an image formed through the zoom lens and picked up by the electronic image sensor is processible so that processed image data corresponding to an image whose profile is changed is output, and wherein the zoom lens, in a state where an infinite object point is in focus, satisfies the following condition:

$$0.7 < y_{07}/(fw \cdot \tan \omega_{07w}) < 0.96$$

where $y_{07} = 0.7 y_{10}$ upon $y_{10}$ being defined as a distance from a center to a farthest point on an effective imaging surface of the electronic image sensor and $\omega_{07w}$ is an angle made by the optical axis with a direction of an object point that corresponds to an image point formed, at the wide-angle position of the zoom lens, on the imaging surface at a position distant from the center of the imaging surface by $y_{07}$.

25. A electronic imaging apparatus according to claim 24, wherein the zoom lens, in a state where an infinite object point is in focus, satisfies the following condition:

$$0.75 < y_{07}/(fw \cdot \tan \omega_{07w}) < 0.94.$$

26. A electronic imaging apparatus according to claim 24, wherein the zoom lens, in a state where an infinite object point is in focus, satisfies the following condition:

$$0.80 < y_{07}/(fw \cdot \tan \omega_{07w}) < 0.92.$$

27. A zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following conditions:

$$0.15 < t_1/fw < 0.6$$

$$0.3 < (R_{1F} + R_{1R})/(R_{1F} - R_{1R}) < 1$$

where $t_1$ is a thickness, measured along an optical axis, of the first lens unit, fw is a focal length of an entire system at a wide-angle position of the zoom lens, $R_{1F}$ is a radius of curvature, measured along the optical axis, of a most object-side surface of the first lens units, and $R_{1R}$ is a radius of curvature, measured along the optical axis, of a most image-side surface of the first lens unit, and
wherein the negative lens component of the first lens unit includes a plurality of lens elements and is constructed as a cemented lens having a cementing surface or a compound lens having an adhering-and-curing surface.

28. A zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following conditions:

$0.15 < t_1/fw < 0.6$ $0.7 < -f_{22}/f_2 < 1.6$ where $t_1$ is a thickness, measured along an optical axis, of the first lens unit, fw is a focal length of an entire system at a wide-angle position of the zoom lens, $f_{22}$ is a focal length of the negative lens component in the second lens unit, and $f_2$ is a combined focal length of the second lens unit, and
wherein the negative lens component of the first lens unit includes a plurality of lens elements and is constructed as a cemented lens having a cementing surface or a compound lens having an adhering-and-curing surface.

29. A zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following conditions:

$0.15 < t_1/fw < 0.6$ $0.8 < -f_{22}/f_2 < 1.2$ where $t_1$ is a thickness, measured along an optical axis, of the first lens unit, fw is a focal length of an entire system at a wide-angle position of the zoom lens, $f_{22}$ is a focal length of the negative lens component in the second lens unit, and $f_2$ is a combined focal length of the second lens unit, and
wherein the negative lens component of the first lens unit includes a plurality of lens elements and is constructed as a cemented lens having a cementing surface or a compound lens having an adhering-and-curing surface.

30. An electronic imaging apparatus comprising:
a zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured; and
an electronic image sensor located on an image side of a lens unit at a most image-side position of the zoom lens,
wherein image data corresponding to an image formed through the zoom lens and picked up by the electronic image sensor is processible so that processed image data corresponding to an image whose profile is changed is output, and
wherein the zoom lens, in a state where an infinite object point is in focus, satisfies the following condition:

$0.7 < y_{07}/(fw \cdot \tan \omega_{07w}) < 0.96$ where $y_{07} = 0.7 y_{10}$ upon $y_{10}$ being defined as a distance from a center to a farthest point on an effective imaging surface of the electronic image sensor, fw is a focal length of an entire system at a wide-angle position of the zoom lens, and $\omega_{07w}$ is an angle made by an optical axis with a direction of an object point that corresponds to an image point formed, at the wide-angle position of the zoom lens, on the imaging surface at a position distant from the center of the imaging surface by $y_{07}$.

31. An electronic imaging apparatus according to claim 30, wherein the zoom lens satisfies the following condition:

$0.15 < t_1/fw < 0.6$ where $t_1$ is a thickness, measured along the optical axis, of the first lens.

32. An electronic imaging apparatus according to claim 30, wherein the first lens unit has at least two aspherical surfaces.

33. An electronic imaging apparatus according to claim 30, further satisfying the following condition:

$-0.5 < (R_{1F} + R_{1R})/(R_{1F} - R_{1R}) < 2$ where $R_{1F}$ is a radius of curvature, measured along the optical axis, of a most object-side surface of the first lens unit and $R_{1R}$ is a radius of curvature, measured along the optical axis, of a most image-side surface of the first lens unit.

34. An electronic imaging apparatus according to claim 30, wherein both surfaces of at least one lens element constituting the second lens unit are aspherical.

35. An electronic imaging apparatus according to claim 30, further satisfying the following condition:

$0.7 < t_2/fw < 1.6$ where $t_2$ is a distance, measured along the optical axis, between a most object-side surface and a most image-side surface in the second lens unit.

36. An electronic imaging apparatus according to claim 30, further satisfying the following condition:

$0.6 < -f_{22}/f_2 < 2.0$ where $f_{22}$ is a focal length of the negative lens component in the second lens unit and $f_2$ is a combined focal length of the second lens unit.

37. An electronic imaging apparatus according to claim 30, further comprising a third lens unit including one positive lens component on an image side of the second lens unit.

38. An electronic imaging apparatus according to claim 30, further comprising a third lens unit including one positive lens component provided with an aspherical surface on an image side of the second lens unit.

39. An electronic imaging apparatus according to claim 37, wherein the third lens unit remains fixed when a magnification of the zoom lens is changed.

40. An electronic imaging apparatus according to claim 37, satisfying the following condition:

$0.1 < fb/fw < 1.0$ where fb is a distance from the third lens unit to the imaging surface of the image sensor.

41. An electronic imaging apparatus according to claim 37, wherein the third lens unit satisfies the following condition:

$$-1<(R_{3F}+R_{3R})/(R_{3F}-R_{3R})<5$$

where $R_{3F}$ is a radius of curvature, measured along the optical axis, of a most object-side surface of the third lens unit and $R_{3R}$ is a radius of curvature, measured along the optical axis, of a most image-side surface of the third lens unit.

42. An electronic imaging apparatus according to claim 37, wherein the first lens unit or the third lens unit includes a plurality of lens elements, each of which other than a lens element having highest Abbe's number is an aspherical lens in which convergence increases progressively in going from a center to a periphery thereof.

43. An electronic imaging apparatus according to claim 30, wherein focusing onto a shorter-distance object point is achieved by shifting the first lens unit to the object side.

44. An electronic imaging apparatus according to claim 30, wherein media of lens elements constituting individual lens units have an approximately uniform refractive index.

45. An electronic imaging apparatus according to claim 30, further satisfying the following condition:

$$0.18<t_1/fw<0.5$$

where $t_1$ is a thickness, measured along the optical axis, of the first lens unit.

46. An electronic imaging apparatus according to claim 30, further satisfying the following condition:

$$0.20<t_1/fw<0.45$$

where $t_1$ is a thickness, measured along the optical axis, of the first lens unit.

47. An electronic imaging apparatus according to claim 30, further satisfying the following condition:

$$0<(R_{1F}+R_{1R})/(R_{1F}-R_{1R})<1.5$$

where $R_{1F}$ is a radius of curvature, measured along the optical axis, of a most object-side surface of the first lens unit and $R_{1R}$ is a radius of curvature, measured along the optical axis, of a most image-side surface of the first lens unit.

48. An electronic imaging apparatus according to claim 30, further satisfying the following condition:

$$0.3<(R_{1F}+R_{1R})/(R_{1F}-R_{1R})<1$$

where $R_{1F}$ is a radius of curvature, measured along the optical axis, of a most object-side surface of the first lens unit and $R_{1R}$ is a radius of curvature, measured along the optical axis, of a most image-side surface of the first lens unit.

49. An electronic imaging apparatus according to claim 30, further satisfying the following condition:

$$0.8<t_2/fw<1.4$$

where $t_2$ is a distance, measured along the optical axis, between a most object-side surface and a most image-side surface in the second lens unit.

50. An electronic imaging apparatus according to claim 30, further satisfying the following condition:

$$0.9<t_2/fw<1.2$$

where $t_2$ is a distance, measured along the optical axis, between a most object-side surface and a most image-side surface in the second lens unit.

51. An electronic imaging apparatus according to claim 30, further satisfying the following condition:

$$0.7<-f_{22}/f_2<1.6$$

where $f_{22}$ is a focal length of the negative lens component in the second lens unit and $f_2$ is a combined focal length of the second lens unit.

52. An electronic imaging apparatus according to claim 30, further satisfying the following condition:

$$0.8<-f_{22}/f_2<1.2$$

where $f_{22}$ is a focal length of the negative lens component in the second lens unit and $f_2$ is a combined focal length of the second lens unit.

53. An electronic imaging apparatus according to claim 37, further satisfying the following condition:

$$0.2<fb/fw<0.8$$

where fb is a distance from the third lens unit to the imaging surface of the image sensor.

54. An electronic imaging apparatus according to claim 37, further satisfying the following condition:

$$0.3<fb/fw<0.6$$

where fb is a distance from the third lens unit to the imaging surface of the image sensor.

55. An electronic imaging apparatus according to claim 37, wherein the third lens unit satisfies the following condition:

$$-0.5<(R_{3F}+R_{3R})/(R_{3F}-R_{3R})<3$$

where $R_{3F}$ is a radius of curvature, measured along the optical axis, of a most object-side surface of the third lens unit and $R_{3R}$ is a radius of curvature, measured along the optical axis, of a most image-side surface of the third lens unit.

56. An electronic imaging apparatus according to claim 37, wherein the third lens unit satisfies the following condition:

$$0<(R_{3F}+R_{3R})/(R_{3F}-R_{3R})<2$$

where $R_{3F}$ is a radius of curvature, measured along the optical axis, of a most object-side surface of the third lens unit and $R_{3R}$ is a radius of curvature, measured along the optical axis, of a most image-side surface of the third lens unit.

57. A zoom lens comprising a plurality of lens units, with a stop between the lens units, wherein one of lens units located on an object side of the stop has a cementing surface or an adhering-and-curing surface, the cementing surface or the adhering-and-curing surface being aspherical.

58. A zoom lens according to claim 57, wherein the cementing surface or the adhering-and-curing surface is provided in a most object-side lens unit.

59. A zoom lens according to claim 58, wherein the most object-side lens unit has negative refracting power.

60. A zoom lens comprising a plurality of lens units, with a stop between the lens units, wherein one of lens units located on an image side of the stop has a cementing surface or an adhering-and-curing surface, the cementing surface or the adhering-and-curing surface being aspherical.

61. A zoom lens according to claim 60, wherein the cementing surface or the adhering-and-curing surface is provided in a most image-side lens unit.

62. A zoom lens comprising a plurality of lens units, with a stop between the lens units, wherein each of one of lens units located on an object side of the stop and one of lens units located on an image side of the stop has a cementing surface or an adhering-and-curing surface, the cementing surface or the adhering-and-curing surface being aspherical.

63. A zoom lens according to claim 62, wherein the lens unit located on the object side of the stop and having the cementing surface or the adhering-and-curing surface is provided with negative refracting power, while the lens unit located on the image side of the stop and having the cementing surface or the adhering-and-curing surface is provided with positive refracting power.

64. A zoom lens comprising:
at least one lens unit with positive refracting power; and
at least one lens unit with negative refracting power,
wherein the at least one lens unit with positive refracting power has a cementing surface or an adhering-and-curing surface, the cementing surface or the adhering-and-curing surface being aspherical.

65. A zoom lens comprising:
at least one lens unit with positive refracting power; and
at least one lens unit with negative refracting power,
wherein the at least one lens unit with negative refracting power has a cementing surface or an adhering-and-curing surface, the cementing surface or the adhering-and-curing surface being aspherical.

66. A zoom lens comprising:
at least one lens unit with positive refracting power; and
at least one lens unit with negative refracting power,
wherein each of the at least one lens unit with positive refracting power and the at least one lens unit with negative refracting power has a cementing surface or an adhering-and-curing surface, the cementing surface or the adhering-and-curing surface being aspherical.

67. A zoom lens of comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following condition:

$$0.15 < t_1/fw < 0.6$$

where $t_1$ is a thickness, measured along an optical axis, of the first lens unit, and fw is a focal length of an entire system at a wide-angle position of the zoom lens,
wherein the negative lens component of the first lens unit includes a plurality of lens elements and is constructed as a cemented lens having a cementing surface or a compound lens having an adhering-and-curing surface, and
wherein a total number of lens components constituting the entire system is four.

68. A zoom lens comprising, in order from an object side:
a first lens unit consisting of one negative lens component; and
a second lens unit including one negative lens component and having positive refracting power as a whole,
where one lens component denotes a single lens, a cemented lens having a cementing surface or a compound lens having an adhering-and-curing surface to which resin is adhered and cured,
wherein the zoom lens satisfies the following condition:

$$0.15 < t_1/fw < 0.6$$

where $t_1$ is a thickness, measured along an optical axis, of the first lens unit, and fw is a focal length of an entire system at a wide-angle position of the zoom lens,
wherein the negative lens component of the first lens unit includes a plurality of lens elements and is constructed as a cemented lens having a cementing surface or a compound lens having an adhering-and-curing surface, and
wherein the second lens unit has only one positive lens component.

69. An electronic imaging apparatus according to claim 30, wherein the second lens unit has only one positive lens component.

* * * * *

UNITED STATES PATENT AND TRADEMARK OFFICE
CERTIFICATE OF CORRECTION

PATENT NO. : 7,289,273 B2 Page 1 of 1
APPLICATION NO. : 11/076236
DATED : October 30, 2007
INVENTOR(S) : Shinichi Mihara It is certified that error appears in the above-identified patent and that said Letters Patent is hereby corrected as shown below:

Claim 31, line 5 (column 24, line 19), change "the first lens" to -- the first lens unit --.

Claim 52, line 4 (column 26, line 11), change "where $f_2$ is..." to -- where $f_{22}$ is... --.

Signed and Sealed this

Seventh Day of October, 2008

JON W. DUDAS
*Director of the United States Patent and Trademark Office*